(12) United States Patent
Krishnamurthy

(10) Patent No.: US 6,256,039 B1
(45) Date of Patent: Jul. 3, 2001

(54) METHODS FOR MANIPULATING CURVES CONSTRAINED TO UNPARAMETERIZED SURFACES

(75) Inventor: Venkat Krishnamurthy, Mountain View, CA (US)

(73) Assignees: The Board of the LeLand Stanford Junior University, Palo Alto; Paraform, Inc., Santa Clara, both of CA (US)

( * ) Notice: Subject to any disclaimer, the term of this patent is extended or adjusted under 35 U.S.C. 154(b) by 0 days.

(21) Appl. No.: 09/133,939

(22) Filed: Aug. 14, 1998

(51) Int. Cl.$^7$ ................................................ G06T 17/00
(52) U.S. Cl. .................. 345/420; 345/425; 345/429; 345/430; 345/433; 345/438; 345/442
(58) Field of Search .................... 345/420, 425, 345/429, 433, 438, 442, 430, 473

(56) References Cited

U.S. PATENT DOCUMENTS

| 5,506,947 | * | 4/1996 | Taubin | 345/433 |
| 5,566,281 | * | 10/1996 | Tokumasu et al. | 345/420 |
| 5,856,828 | * | 1/1999 | Letcher, Jr. | 345/420 |

OTHER PUBLICATIONS

Krishnamurthy, V., et al., Fitting Smooth Surfaces to Dense Polygon Meshes, Computer Graphics Proceedings, Annual Conference Series, pp. 313–324, 1996.
Kass, M., et al., Snakes: Active Contour Models, International Journal Of Computer Vision, pp. 321–331, 1998.
Barr, A. et al., Smooth Interpolation of Orientations with Angular Velocity Constraints Using Quarternions, Computer Graphics, vol. 26, pp. 313–320, 1992.
Milroy, M., et al., Segmentation of a Wrap–Around Model Using an Active Contour, Computer Aided Design, vol. 29, No. 4, pp. 299–319, 1997.

Chen, J., et al., Shortest Paths on a Polyhedron, Proc. 6$^{th}$ Annual ACM Symposium on Computational Geometry, pp. 360–369, 1990.

\* cited by examiner

*Primary Examiner*—Mark Zimmerman
*Assistant Examiner*—Kimbinh T. Nguyen
(74) *Attorney, Agent, or Firm*—Lumen Intellectual Property Services, Inc.

(57) ABSTRACT

A computer-implemented method for drawing and manipulating curves on polygon mesh surfaces possesses a built in surface constraint that provides a better intuition for the shape and position of a curve than conventional unconstrained three dimensional space curves. The method includes storing the following graphical data structures in a memory: a 2-D polygon mesh embedded in a 3-D ambient space, a 1-D face point curve v embedded in the 2-D polygon mesh, a first-order curve weighting function $\alpha$, and a second-order curve weighting function $\beta$. The method also comprises computing a displacement dv of the face point curve v to produce a displaced face point curve v'=v+dv, wherein v' is embedded in the 2-D polygon mesh, and wherein the displacement dv is computed in dependence upon $\alpha$ and $\beta$. A rendered representation of the polygon mesh and the displaced face point curve are then displayed. In a preferred embodiment of the invention, computing the displacement dv comprises calculating a set of displacement vectors corresponding to a set of face points of the curve v, wherein each vector in the set of displacement vectors is tangent to the polygon mesh at a face point corresponding to the vector. The displacement dv is computed in dependence upon a function S defined on the polygon mesh. The function S may be a function determined in part from user input, from an external force, and/or from a curvature of the polygon mesh. The external force may be determined from a coloring of the polygon mesh, and/or from a user manipulating the curve. The computing and displaying steps can be repeated to produce a displayed relaxation of the curve.

20 Claims, 16 Drawing Sheets

FIG. 4A
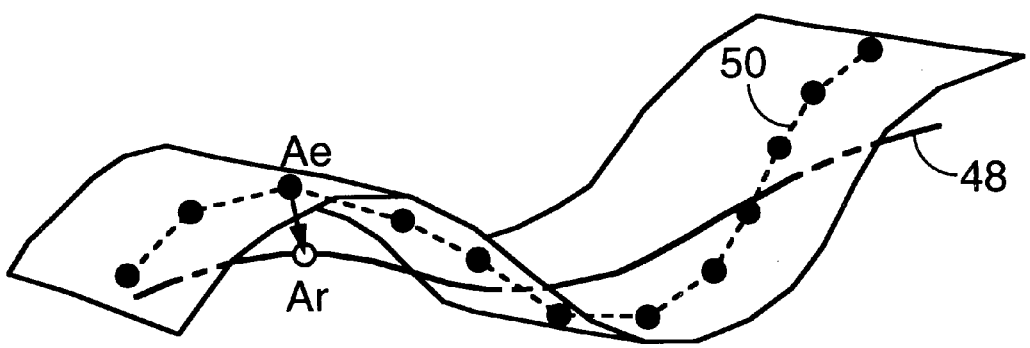
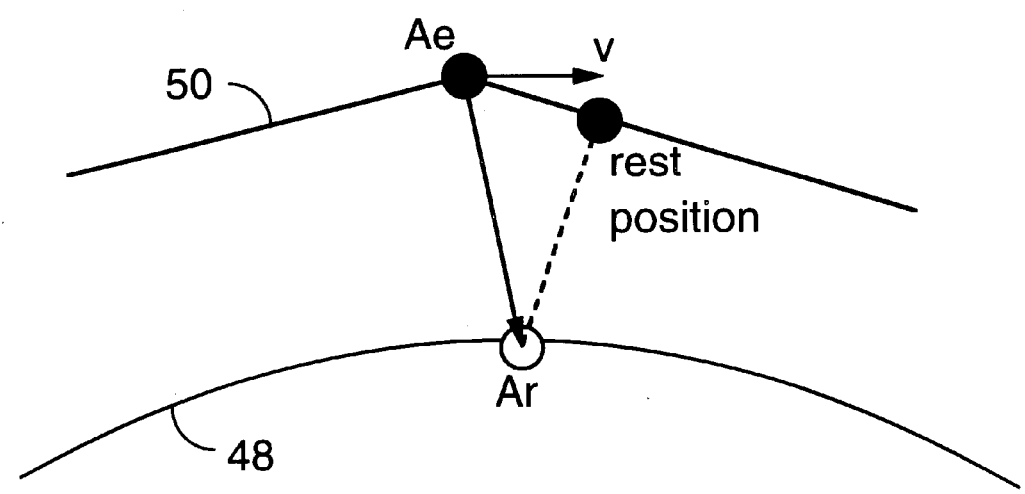
FIG. 4B

METHODS FOR MANIPULATING CURVES CONSTRAINED TO UNPARAMETERIZED SURFACES

This invention was supported by the National Science Foundation under contract number CCR-9157767. The U.S. Government has certain rights in the invention.

BACKGROUND

Recent developments in the field of computer animation enable designers to manipulate representations of physical objects that have been scanned into a computer using lasers. The representation is often a two-dimensional (2-D) surface (i.e., a 2-dimensional manifold) embedded in three-dimensional (3-D) Euclidean space. The surface is constructed by collecting laser range information from various viewing angles and combining it to reconstruct the surface of the object. Typically, this surface is represented in unparameterized form. For example, a common unparameterized surface representation is a polygon mesh, i.e., a collection of polygons joined at their edges. This polygon mesh model of the physical object then forms the basis for subsequent manipulation and animation.

In order to facilitate the manipulation of the polygon mesh, it is desirable for a user to be able to interactively draw curves on the surface of the polygon mesh. Since the user, in general, should be free to dictate the placement of the curves, the ability to precisely position these curves relative to the surface geometry is crucial to effective curve drawing.

Space Curves

A known technique allows the user to draw space curves, i.e., curves in 3-D space defined by specifying a collection of points in space through which the curve is constrained to pass. This technique for drawing and representing curves, however, has various problems when applied to drawing curves on surfaces. Although the space curve can be defined to pass through specified points on the surface, it is not otherwise constrained to the surface of the mesh. Consequently, it usually intersects and is occluded by large portions of the surface itself, making for poor visualizations. In addition, because these space curves are not constrained to the surface, the user must manually ensure that the curve closely follows the surface geometry. If either the surface geometry or the curve shapes (or both) are complex, this process is likely to be tedious and error prone. For example, using space curves it is possible to generate curves that depart significantly from the surface mesh even when they might appear to remain close to it. The fact that the polygonal mesh models are typically very large only serves to further exacerbate these problems.

Surface Curves

While manipulating curves in Euclidean space ($\Re^2$ or $\Re^3$) is a well studied subject, there has been little work on the subject of manipulating curves on arbitrary curved 2-D manifolds. In the case where the manifold is represented as a parameterized surface in 3-D Euclidean space, the curve definition problem is effectively transformed to a problem in the Euclidean plane (i.e., the curve coordinates lie on the parametric plane). In this case, techniques for manipulating curves on parametric surfaces are well studied. Often, however, there is no obvious mapping, or parameterization, of a surface to the Euclidean plane, such as in the case of polygon meshes. Consequently, there are no techniques that allow a user to manipulate curves directly on the surface of a polygon mesh. Moveover, none of the known techniques for manipulating curves on surfaces have addressed the issues of intuitiveness of control, computational complexity of the optimization steps or the interactivity of their algorithms. Further, existing methods all make assumptions about certain restrictive properties of their underlying surface representation, e.g., smoothness, parameterization, and differentiability. While these assumptions may be valid for other problem domains, they do not hold for unparameterized surfaces such as polygonal meshes. Consequently, known methods do not solve many problems with editing and manipulating curves on surfaces in the context of 3-D computer animation.

Active Contours of 2-D Objects in 2-D Euclidean Space

Kass et al. has developed active contours of 2-D objects for the purpose of assisting in the performance of high level pixel image processing operations such as identifying subjective contours, motion tracking and performing stereo matching. These active contours are curves embedded in 2-D Euclidean space that have minimal energy when they closely approximate the 1-D contour of a 2-D object, i.e., when they match the outline of the object in the pixel image. They called these curves snakes for their snake-like behavior during a series of energy minimizing steps. A snake under this definition is an energy minimizing curve associated with an underlying 2-D pixel image. The energy of the snake is measured as a combination of internal constraints, image-based constraints and user supplied (external) constraints. For a curve $v(s)=(v_x(s), v_y(s))$ defined in the x-y plane of the pixel image, this energy is written as:

$$E_{snake} = \int_0^1 E_{internal}(v(s)) + E_{image}(v(s)) + E_{constraint}(v(s)) ds \qquad (1)$$

In the equation above, the arc length parameter s varies from 0 to 1 (the length of the curve is normalized to one). The function $E_{internal}$ represents the internal energy of the snake due to the internal stretching and bending of the curve. The function $E_{image}$ represents the energy of the curve due to properties of the underlying image (e.g. intensity magnitudes or gradients) and $E_{constraint}$ represents external energy (e.g. based on user-defined constraints). The snake attempts to reach a final state that minimizes $E_{snake}$.

In order to develop an intuition for what these energy terms represent, consider the internal energy term $E_{internal}$. This can be further expanded as:

$$E_{internal}(v(s)) = \alpha(s)|v_s|^2 + \beta(s)|v_{ss}|^2 \qquad (2)$$

where $\alpha$ and $\beta$ are weighting functions, $v_s = \delta v/\delta s$ and $v_{ss} = \delta^2 v/\delta s^2$. The presence of the first order term $|v_s|^2$ serves to minimize the length of the snake. For an intuition of what this term accomplishes, imagine the behavior of a pliable, elastic band that is constrained to pass through a series of hooks. The elastic band shrinks its length to be as short as possible and still pass through those hooks. For this reason, the first order term is sometimes referred to as the membrane energy or stretching energy of the curve. The term locally characterizes a $C^0$ curve that need only be continuous but not differentiable, i.e., the curve can have sharp corners.

The second order term $|v_{ss}|^2$ minimizes the curvature over the length of the curve. For an intuition for what this accomplishes, imagine the behavior of a stiff wire that is constrained to pass through a series of hooks (like the membrane in our example above). Since the wire is resistant to bending, the resulting curve is smooth. For this reason, the second order term is sometimes referred to as the thin plate energy or bending energy of the curve.

Quantitatively, the term locally characterizes a $C^1$ curve, i.e., a curve that is continuous and has a continuous first derivative.

The functions α(s) and β(s) are referred to as continuity control functions. By changing them one can control the relative strengths of the stretching and bending terms and therefore the shape of the curve. For example, if β(s')=0, then v(s') is a local discontinuity of the curve. If β(s')=0, then v(s') is a sharp corner of the curve. The curve produced by equation 2 is called a controlled continuity spline because one can change the continuity at any point along the curve by manipulating the continuity control functions α(s) and β(s). Using the controlled continuity spline and judicious formulations for $E_{image}$ and $E_{constraint}$, a variety of useful behaviors may be obtained for these snakes.

Although the contour snakes discussed by Kass et al. have some valuable properties in their context, they are limited to the problem of approximating a 1-D outline of an object in a 2-D pixel space. They are not useful in the context of drawing curves on curved 2-D surfaces embedded in a 3-D space. Moreover, Kass et al. are concerned with problems associated with 2-D pixel image processing, and do not address any of the issues or problems associated with drawing curves that are intended to follow an unparameterized, curved 2-D surface embedded in three dimensions.

SUMMARY

In view of the above, it is a primary object of the present invention to avoid the problems associated with the known techniques for drawing and representing curves on polygon mesh models. In contrast with prior techniques using space curves, the techniques provided by the present invention allow the direct manipulation of surface curves, i.e. curves that are necessarily constrained in their entirety to a surface such as a polygon mesh. Moreover, the techniques of the present invention allow the manipulation of surface curves on unparameterized surfaces such as polygon meshes.

By definition, surface curves have a built in surface constraint and hence avoid the many problems associated with space curves. For example, curves that are naturally constrained to the surface provide a better intuition for the shape and position of a curve than unconstrained three dimensional space curves. Because of the way they behave while editing, these surface curves are also called surface snakes. These novel surface curves facilitate the creation of flexible curve editing tools that overcome the shortcomings of editing based on space curves. Tools based on surface snakes operate directly on the surface curve (rather than indirectly through a space curve) and hence are more flexible and intuitive to use than tools based on space curves. In addition, surface snakes also allow the use of surface properties such as vertex color to assist in the curve editing process. Such operations are not possible using just space curves.

In one aspect of the invention, a method is provided for manipulating or otherwise altering curves on a surface in a 3-D computer graphics system. The method comprises storing in a memory an unparameterized surface and a surface curve v comprising a set of surface points lying on the surface and a first-order curve weighting function α. An unparameterized surface is a 2-dimensional manifold without any smooth global parameterization. In one embodiment of the invention, the unparameterized surface is a polygon mesh representation of a 2-dimensional manifold embedded in a 3-dimensional ambient space. A polygon mesh is an example of an unparameterized surface because no single differentiable formula can be used to define it globally. In one embodiment of the invention, the surface curve v is a face-point curve representation of a 1-dimensional manifold embedded in the unparameterized surface. The method also comprises computing a displaced surface curve v'=v+dv. The displaced curve comprises a set of displaced surface points lying on the surface and the first-order curve weighting function α. Computing the displaced surface curve v' comprises constraining the displaced surface points of v' to the surface and imposing on the displaced surface points of v' a form derived from the first-order curve weighting function α. The displaced surface curve v' is stored in the memory. In one embodiment, the displaced surface curve v' is a face-point curve representation of a displaced 1-dimensional manifold embedded in the surface. In a preferred embodiment, the surface curve v and the displaced surface curve v' further comprise a second-order curve weighting function β. In this case, computing the displaced surface curve v' further comprises imposing on the displaced surface points of v' a form derived from the second-order curve weighting function β. In some cases, α and β are constant along the curve, while in other cases α and β vary along the curve. The method may comprise determining α and β from user input, such as from a pointing device. In a preferred embodiment, the method includes displaying a rendered representation of the displaced surface curve. The displaying may be used as part of a user-controlled curve editing procedure. The computing may be repeated to produce a relaxation of the curve.

In one embodiment of the invention, computing the displaced surface curve v' comprises calculating a curve displacement dv comprising a set of curve displacement vectors. Each curve displacement vector in dv corresponds to a surface point of the surface curve v, and is tangent to the surface at the surface point. Because the displacement vectors are tangent to the surface, the displaced curve remains on the surface. In some cases, calculating the curve displacement dv comprises assigning to a curve displacement vector a predetermined value, such as zero or a value determined from user input. In one embodiment, computing the displaced surface curve v' further comprises calculating the displaced surface curve in part from a function S defined on the surface. The function S may be determined in part from user input, such as from a pointing device, and/or in part from from a color or curvature data associated with the surface. In one embodiment, computing the displaced surface curve further comprises imposing on the displaced surface points of v' an arc length force term.

BRIEF DESCRIPTION OF THE DRAWING FIGURES

Figure 3A:
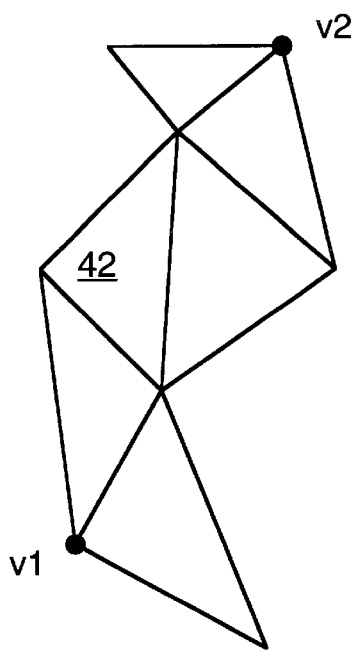
Figure 3B:
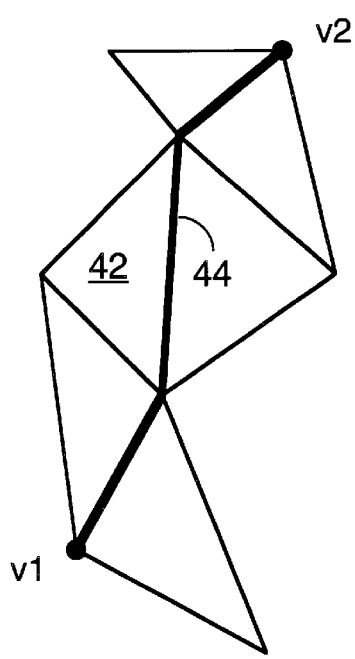
Figure 3C:
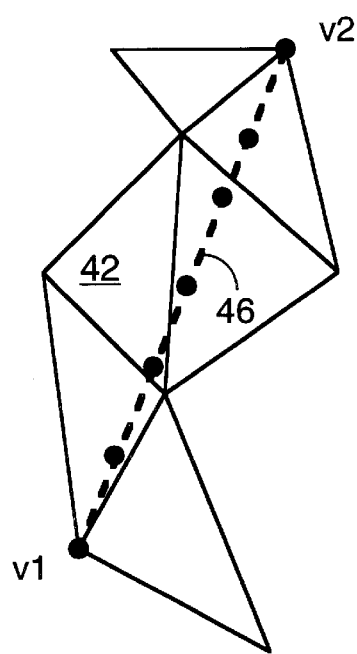

FIGS. 3A, 3B, and 3C illustrate a technique for curve painting according to the present invention.

FIGS. 4A and 4B illustrate a technique for smoothing surface curves with space curves, according to the invention.

Figure 5:
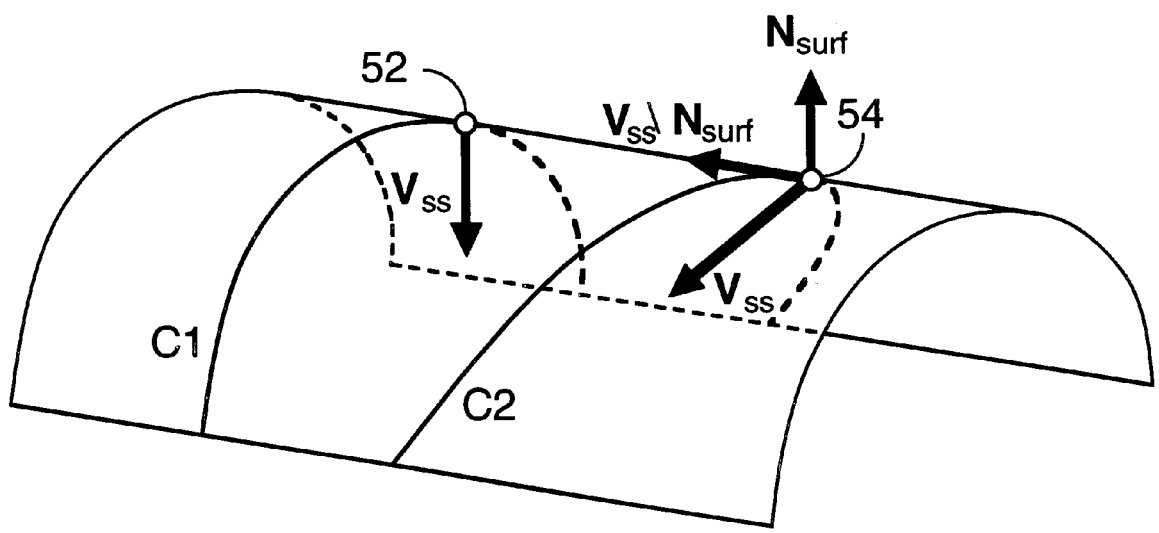

FIG. 5 illustrates normal and tangential curvatures for a surface curve.

Figure 6A:
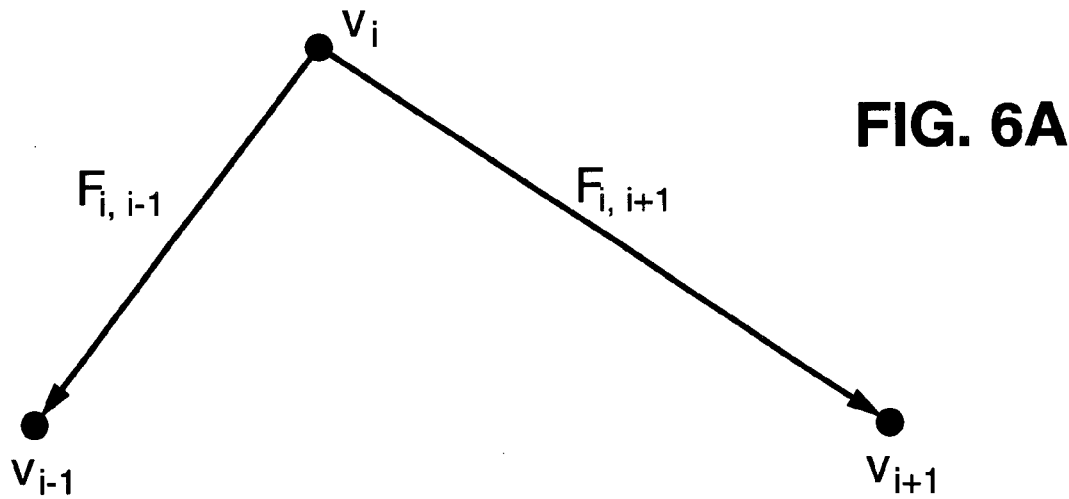
Figure 6B:
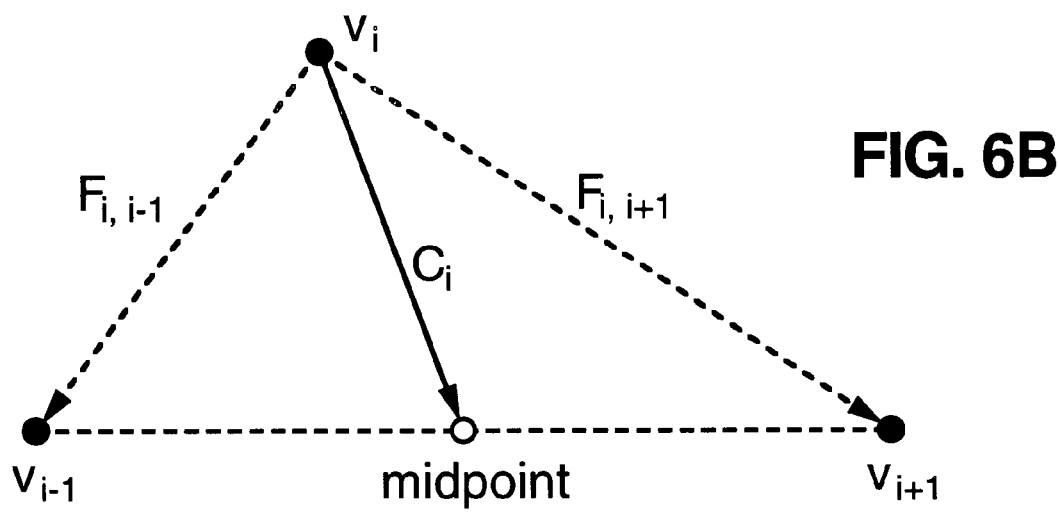

FIGS. 6A and 6B illustrate the decomposition of the discrete Euler equations into forces on individual face points, according to the invention.

Figure 7A:
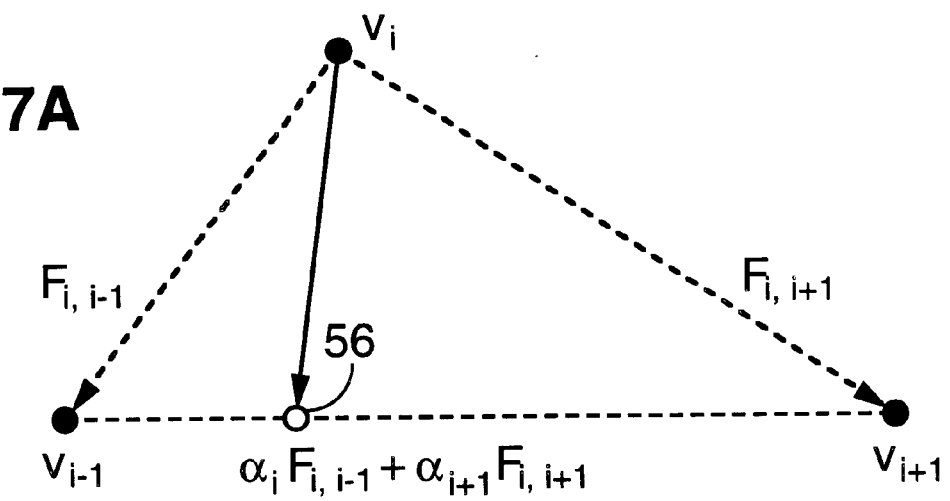
Figure 7B:
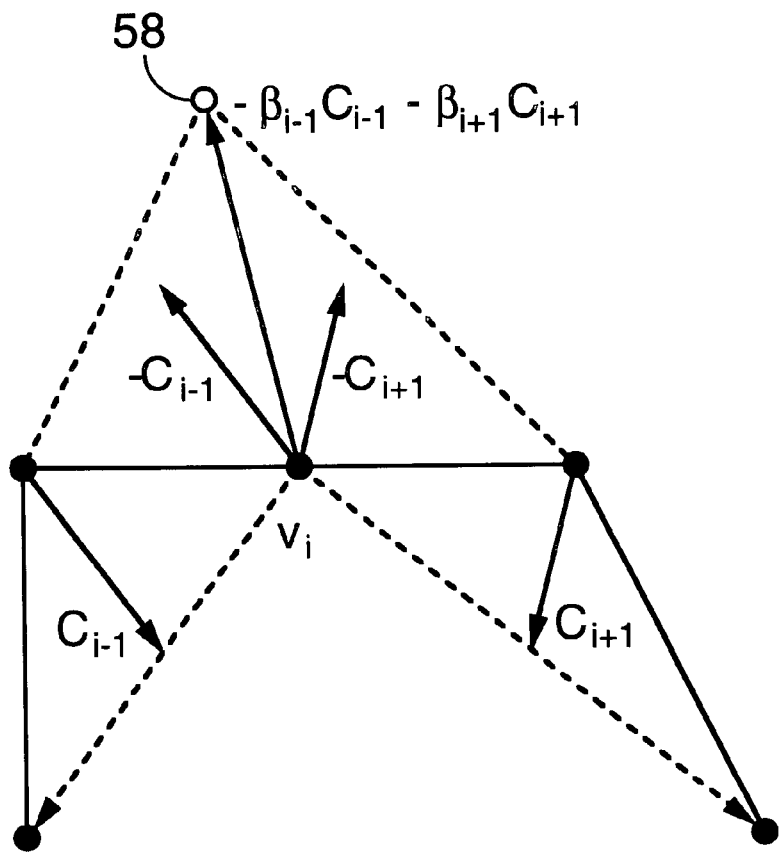

FIGS. 7A and 7B illustrate a 2-D visualization of resultants corresponding to each of the membrane and thin plate terms of variational Euler forces.

Figure 8A:
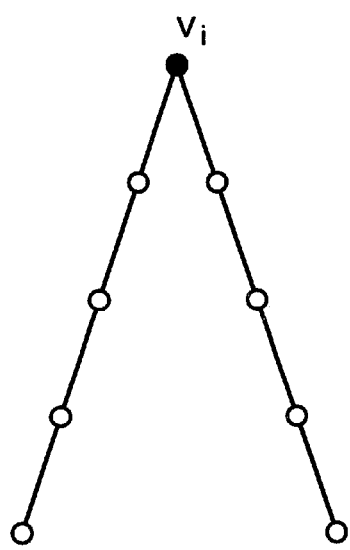
Figure 8B:
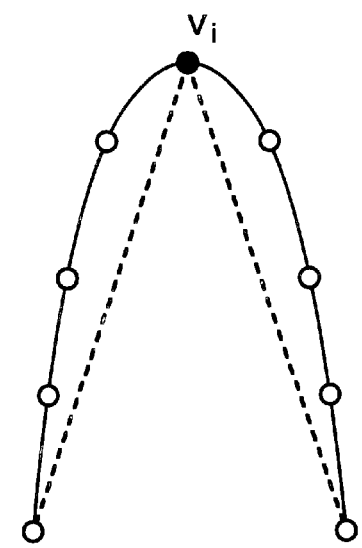
Figure 8C:
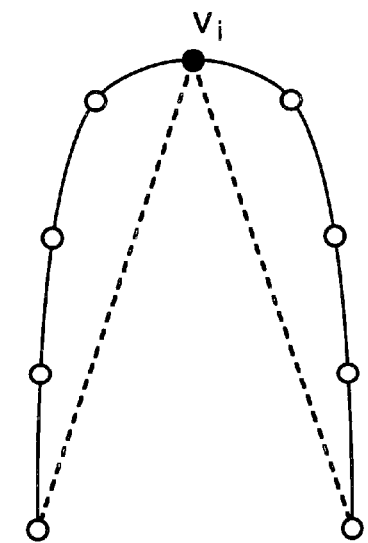

FIGS. 8A, 8B, and 8C illustrate the effect of snake continuity control functions.

Figure 9:
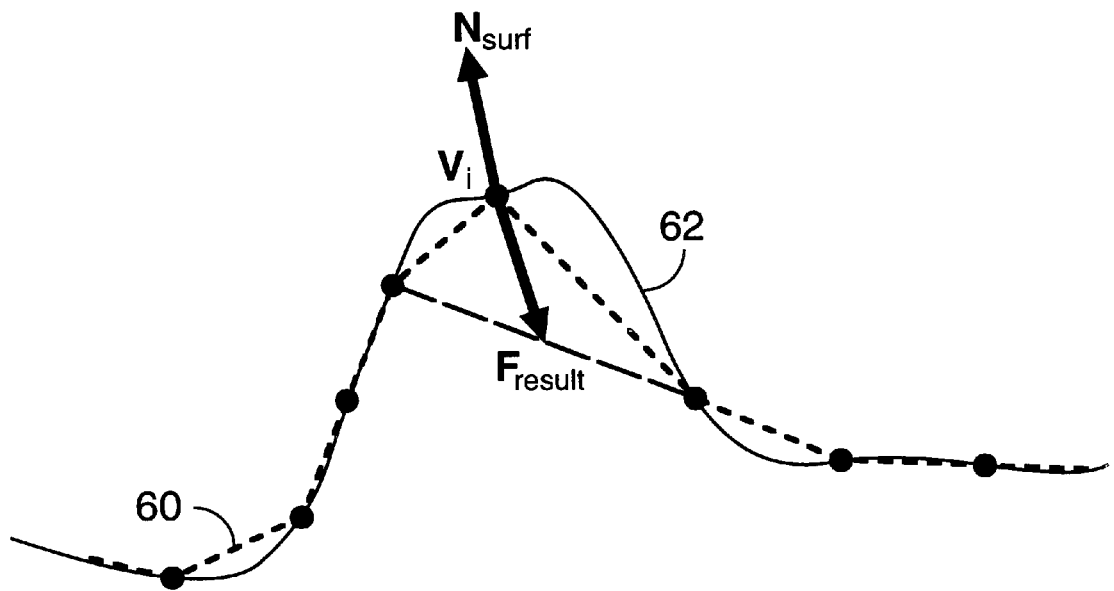

FIG. 9 illustrates how to maintain a uniformly sampled surface snake.

Figure 10:
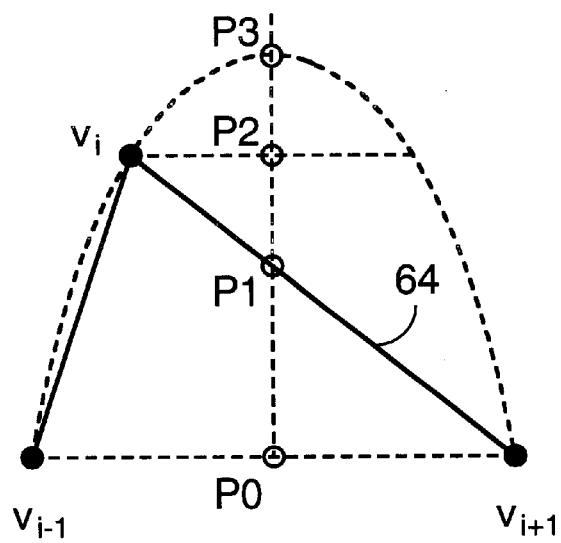

FIG. 10 illustrates the arc length criterion for maintaining a uniformly sampled snake.

Figure 11:
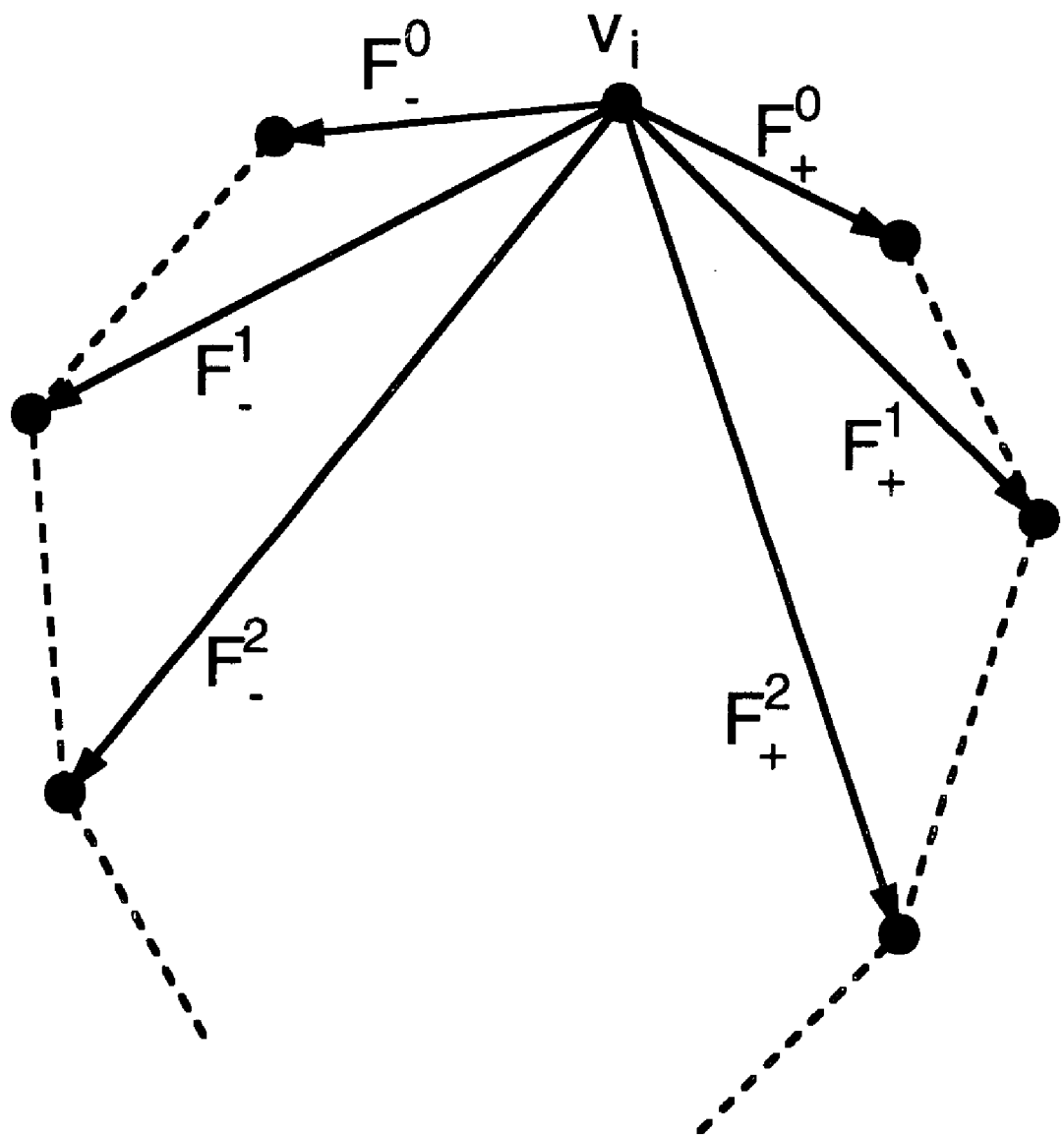

FIG. 11 illustrates coarse-to-fine relaxation for a snake.

FIGS. 12A–12D illustrate surface snake based curve editing.

FIGS. 13A–13F show color attraction of a space curve and a surface curve to color data on a surface.

FIG. 14 illustrates the computation of the color gradient at a vertex.

FIGS. 15A–D illustrate the use of a color attraction force during surface snake relaxation.

Figure 16A:
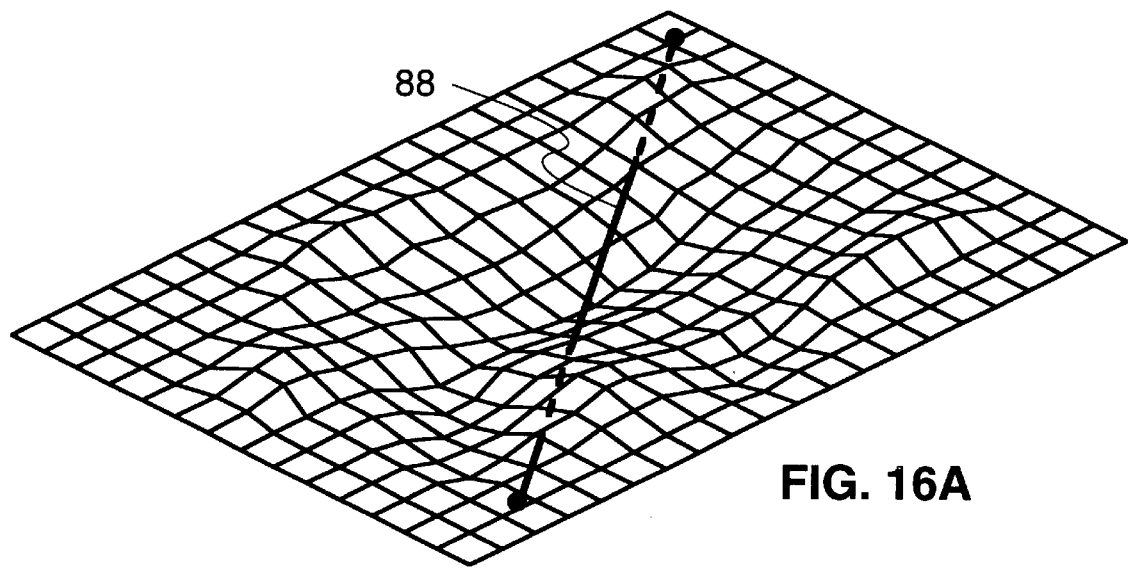
Figure 16B:
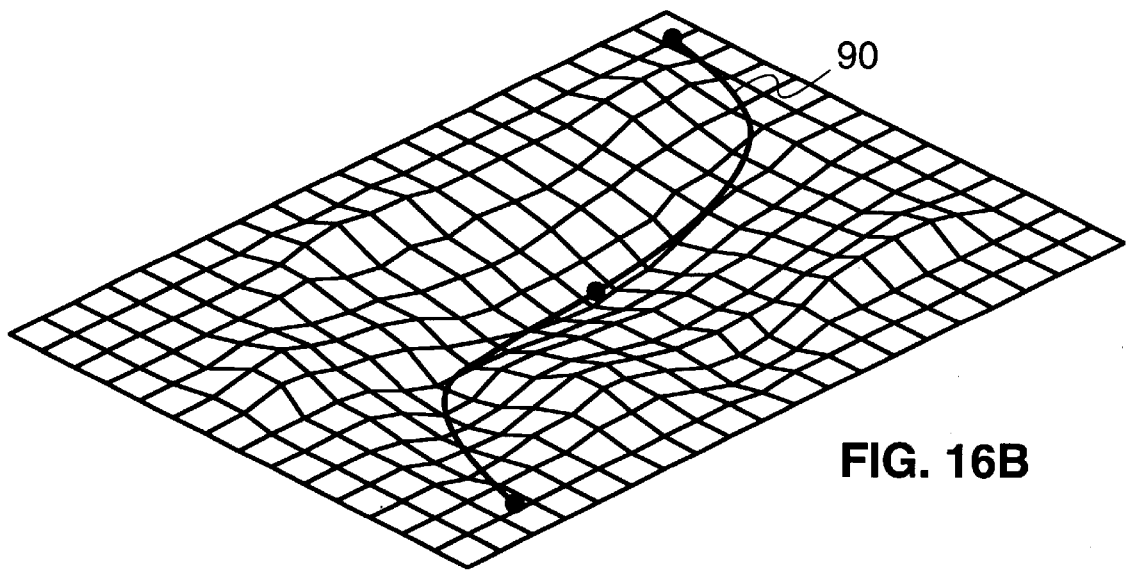

FIGS. 16A and 16B contrast a space curve with an intuitive surface curve of the invention.

DETAILED DESCRIPTION

CURVE REPRESENTATION

Throughout this document, we define an unparameterized surface to be a 2-dimensional manifold without any smooth global parameterization. A polygon mesh is an example of an unparameterized surface because no single differentiable formula can be used to define it globally. We define a polygon mesh or polygon surface to be a 2-dimensional manifold represented as a union of polygons. Typically, the polygons and the polygon surface are represented as 2-manifolds embedded in 3-D Euclidean space. For example, a polygon mesh may be represented as a set of points (called vertices) in 3-D Euclidean space, together with a set of faces (groups of 3 or more vertices that share a common face), a set of edges (groups of 2 vertices that share an edge), and an adjacency structure that can be used to easily determine which vertices, edges, and faces are adjacent to any given vertex, edge, or face. A surface curve on a surface is defined to be a 1-dimensional manifold embedded in a 2-D manifold (the surface).

Figure 1A:
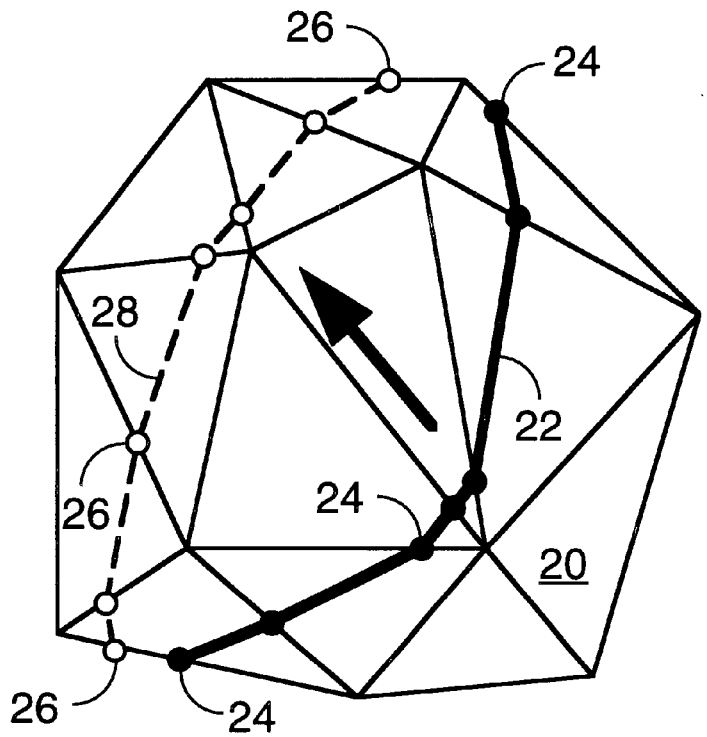
FIGS. 1A and 1B show, respectively, a conventional edge-point representation of a surface curve and the face-point representation of the present invention.
Figure 1B:
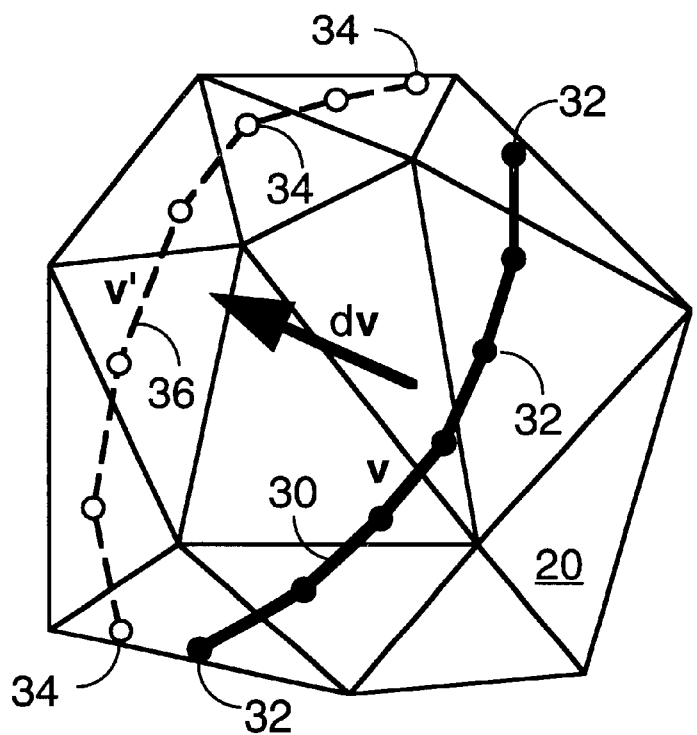

A surface curve on a polygon mesh 20 may be accurately represented as a discrete polygonal geodesic, as shown in FIGS. 1A and 1B. The traditional representation of a surface curve, shown in FIG. 1A, is an edge-point curve 22, i.e., a chain of edge-points 24 such that two successive edge-points lie on some two edges (or a corner) of the same face. While this representation is a useful and elegant one for some operations, it is unsuitable for most curve editing. For example, FIG. 1A demonstrates a simple editing operation on an edge-point curve 22 on a polygonal surface 20. After the editing operation, the points 24 of the curve 22 are moved to displaced points 26 on a displaced curve 28. Notice that successive points on the curve before and after the editing operation must lie on at least two edges (or a vertex) of each polygon that the curve crosses. This constraint can make the representation inefficient for interactive curve editing purposes since one must keep track of where the curve intersects the surface at each stage of the editing operation. In addition, this representation sometimes results in an uneven distribution of points and undesired distortions of the curve.

A simpler alternative to the edge-point representation is a face-point representation, as shown in FIG. 1B. A face-point curve 30 includes a sequence of connected face points 2, where a face point is simply a point on some face of the polygonal surface 20. A face-point curve may be represented, for example, by a sequence of points embedded in 3-D Euclidean space, where each point is contained in a face of the polygon mesh. The representation often includes a specification of the face to which each point in the curve belongs. We do not place an explicit constraint on the relative positions of successive face points of the curve. An editing operation on a face-point representation of a surface curve is shown in FIG. 1B. In this case, the editing operation moves face points 32 to their new displaced locations 34 corresponding to a displaced curve 36. The intersection of the face-point curve with edges of the polygon mesh does not need to be stored or computed at any point of the editing operation. Because it is not necessary to explicitly maintain intersections of the curve with edges of the polygonal mesh, the curve editing operation can be made more efficient. The curve is visualized (i.e., rendered) using a piecewise linear reconstruction through its constituent face points. Since surface curves can be occluded (in a 2-D rendering) by the surface geometry itself they can be rendered together with the surface geometry using a conventional hidden surface algorithm.

Figure 2A:
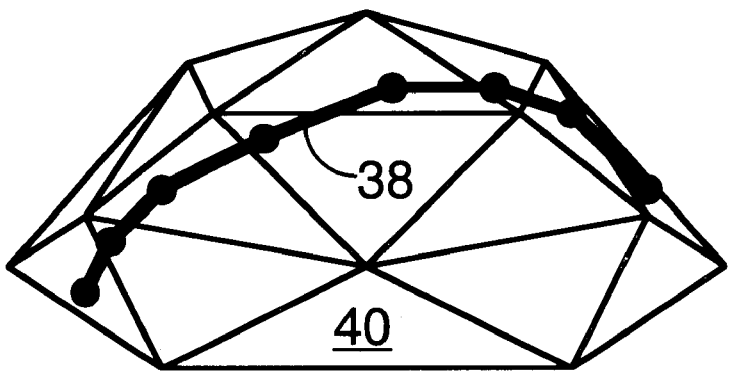
FIGS. 2A and 2B show a linear reconstruction of a face-point curve that intersects a polygonal surface.
Figure 2B:
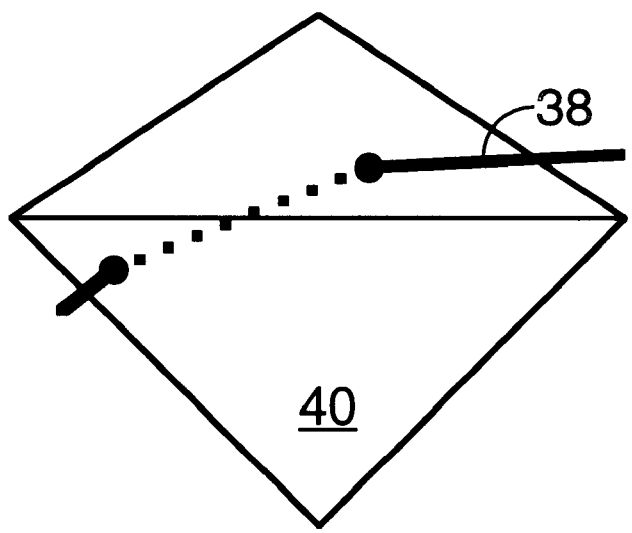

Although the face-point curve representation is computationally efficient, a linear reconstruction of a face-point curve might intersect the surface of the polygonal mesh. A hidden surface rendering of face-point curves could therefore result in portions of the surface curve being occluded by the surface geometry itself. Such a rendering would provide an unsatisfactory intuition for the placement of a face-point curve relative to the surface. An example of this is shown in FIGS. 2A and 2B. A face-point curve 38 on a polygonal surface 40 is shown in FIG. 2A. A close-up section of the face-point curve 38 that intersects the mesh is shown in FIG. 2B, with the hidden portion of the curve shown as a broken line. This potential drawback of the face-point representation, however, can be avoided in practice by selecting the sampling density of the curve to be reasonably high. In particular, the rendering is satisfactory if the sampling density is selected so that on the average no two face points are separated by more than the width of one polygon (i.e., successive face points are either on the same face or on adjacent faces). We discuss later one method to maintain a uniform sampling over the length of a face-point curve.

CURVE PAINTING

Given our choice to represent curves as surface curves, there are several possible methods for a user to place them on the surface. One known method is to draw three dimensional space curves and then project these curves on the polygonal surface. Another method is to use planes to cut sections of the object and have those sections define curves on the mesh surface. While these tools are useful they do not provide the intuitive feedback that a surface painting tool should provide. For instance, the curve projection method is prone to failure in regions of the surface that have high curvature. In the case of a cutting plane tool the shape of the surface curve defined is severely limited: it can only be a planar contour on the surface. Furthermore, these tools do not use surface shape as an integral part of the curve specification process. Therefore, the user cannot rely on intuition about surface shape during the curve specification process.

Instead, the present invention allows the user to paint the curves directly on the mesh surface. FIGS. 3A, 3B, and 3C illustrate the specifics of a curve painting process according to the invention. In the first step the user picks a sequence of vertices on the polygon mesh 42 that represent a sequence of points that lie on the surface curve. Two successively picked vertices v1 and v2 are shown in FIG. 3A. The picking task is a straightforward one and can be accomplished in a number of ways. In the preferred embodiment, the following method is used: the user selects a series of points on a 2-D projection (or rendering) of the polygon mesh. This rendering stores an item buffer that associates for each screen pixel a set of mesh vertices that map to that pixel in the rendering. When a screen pixel is selected by the user the program searches the pixel's item buffer to compute the vertex of the mesh that is closest to the viewer. Another equally practical method for accomplishing this picking operation is to trace a ray through the screen position under the mouse and intersect it with a face point on the mesh surface. The preferred embodiment implements the former approach for its simplicity and due to the fact that the operation is hardware accelerated on most workstations.

Once the points of the curve have been selected, a surface curve is constructed that passes through these selected points. It is worth noting that, for any two selected points, there is no unique curve joining the two points, since there are many possible surface curves that connect each pair of surface points. The most obvious surface curve to use is the shortest surface curve between the two points, i.e., a discrete geodesic. Unfortunately true geodesic computation is very expensive ($O(n^2)$ in the size of the mesh) and would severely limit the interactivity of the painting process. It is therefore a less desirable option for our application. It should be noted, however, that approximations to geodesics can be used that are less computationally intensive than true geodesics.

In the preferred embodiment, a curve is computed that represents a sampling of the projection on the polygonal surface of a line joining each pair of successive points. We choose this over other possibilities because it is a plausible approximation to a geodesic between the two user points. Furthermore, the computation may be accomplished using purely local surface information and is therefore rapid. If two consecutively picked surface points lie on the same face, the projection operation is trivial. If this is not the case, then we compute a face-point curve section between the two points in two steps, as follows.

First, we compute a graph path 44 between the start face point v1 and the end face point v2 of the curve section, as shown in FIG. 3B. This path is defined as a sequence of connected vertices of the mesh 42, such that the start vertex is the closest to the starting face point and the end vertex is closest to the end face point. A greedy graph search algorithm computes this path. Given a vertex on the path, the greedy algorithm selects as the next vertex the mesh neighbor that is closest in Euclidean space to the ending face point.

We then smooth this path with a straight line joining the start and end points. The smoothing operation is based on a procedure called CurveAttract which is explained in more detail below. Using this procedure, the jagged graph path 44 is first sampled into a set of face points and then smoothed using a straight line joining v1 and v2, as shown in FIG. 3C. This process yields a face-point curve section 46 through the picked vertices. The face-point curve section is the projection of a straight line onto the surface. Therefore, the painted surface curve is a projection on the surface of a piecewise linear curve.

This two-step smoothing operation is more robust than a direct one-step projection of a line on the surface. As explained earlier, a one-step projection to the surface can suffer catastrophic failures in regions of the polygon mesh that have high curvature. Our two-step process is robust to abrupt changes in surface curvature and shape since it starts out with a good initial guess of the path on the surface (i.e., the graph path).

It is worth noting that the above procedure is not guaranteed to provide the shortest possible path through the picked points. The graph paths were created using a local (greedy) heuristic and the subsequent smoothing operation moves face points only locally on the surface. However, a shortest path through the points does not have any special significance for our application. A plausible approximation to it suffices for our purposes.

CURVE EDITING USING SPACE CURVES

In practice, once a user has drawn a surface curve the user will then want to edit this curve to move it into a more desirable position. At the very least, the user will typically want to smooth the surface curve so it takes on more desirable appearance. Before discussing the preferred surface snake editing tools, we first discuss useful improvements in traditional editing tools based on space curves. Given a face-point curve and an unconstrained three-dimensional space curve, these tools use the space curve to smooth the face-point curve. They accomplish this by "attracting" the face-point curve (on the surface) to the space curve.

Attracting Face-point Curves to Space Curves

The present invention provides a curve smoothing procedure called CurveAttract that attracts a surface curve to a space curve. Recall that in the preferred embodiment of the present invention a surface curve is represented as a series of connected face points. Let us assume for the moment that we are supplied a space curve 48 that is to be used to smooth the face-point curve 50, as shown in FIG. 4A. As a first step in curve smoothing, the space curve is sampled uniformly (by arc length) into a number of individual three dimensional points. Each such point in space is associated with each face point of the surface curve. For example, space curve point Ar is assoicated with surface curve point Ae. The curve smoothing procedure slides each face point of the surface curve to a new location on the surface such that it becomes the closest point on the surface to its corresponding point on the space curve. FIG. 4B shows a 1-D magnified view of a portion of FIG. 4A, where the face point Ae is displaced to a rest position that is closer to the space curve point Ar.

If the space curve has a plausible projection on the surface, the CurveAttract procedure ensures that the face-point curve represents this projection. Furthermore, the process is rapid since it uses purely local information when sliding points over the polygonal surface. However, if the space curve used for smoothing is not well chosen, CurveAttract is prone to non-robust behavior. First, notice that the movement of a face point does not affect its neighbors in the face-point curve: each face point is treated on an individual basis when it is moved over the surface. Thus, if the space curve used for smoothing was itself non-uniformly sampled, the smoothed face-point curve will also be non-uniformly sampled over its length. A second potential pitfall of the process is that if either the space curve does not possess a plausible projection on the surface or there are abrupt changes in surface curvature, applying the process could lead to an undesirable distribution of face points within the smoothed face-point curve. This, in turn, could lead to poor visualizations. If the space curve used for CurveAttract was itself sampled uniformly over its length and had a plausible projection on the surface, the process does well, i.e., the smoothed face-point curve is a faithful sampling of the projection on the surface of the space curve. Clearly, the choice of a suitable space curve is an important one. The next section first discusses a method for choosing a suitable space curve and then examines some curve editing operations based on this method.

Fitting a B-spline Curve to the Face-point Curve

For editing operations that are based on space curve smoothing, we have chosen the space curve representation to be uniform B-splines. This representation is widely used by 3-D modelers in various contexts and as such it enables the use of familiar editing operations (e.g. control vertex manipulation). Other parametric curve representations may be easily substituted into our approach.

We arrive at an initial location of the three dimensional B-spline (space) curve through a least squares fit of the face-point curve data. The equation for a uniform B-spline curve C(u) can be written as:

$$C(u) = \sum_{i=0}^{N} X_i B_i(u) \qquad (3)$$

In the equation, $B_i(u)$ is the well-known uniform B-spline basis function and $X_i$ are the control vertices of the B-spline curve. Initially the control vertices are unknown to us; we must choose them to form a reasonable approximation to our surface curve. Therefore, given the number of control vertices N desired in the approximating B-spline curve and the face points $P_j(x, y, z)$ of the surface curve, we need to determine the locations of a suitable set of control vertices (i.e., $X_i$) such that the resulting B-spline curve C(u) is a good approximation to the face points. This is a traditional curve approximation problem. For our particular case the problem can be framed as a non-linear least squares problem. This is explained as follows. In equation 3 we need to find the $X_i$ as well as u values for each data point $P_j(x, y, z)$. Since the B-spline basis functions we use are non linear (in general they are of order 4) in u the approximation problem is a non-linear one. One solution to this approximation problem proceeds as follows. Assume that we have assigned a parameter value (i.e., a $u_j$ value) for each data point $P_j(x, y, z)$. For the $j^{th}$ data point equation 3 can then be written as:

$$P_j(x, y, z) = C(u_j) = \sum_{i=0}^{N} X_i B_i(u_j) \qquad (4)$$

We get one such equation in the variables $X_i$ for each face point. In our application, this set of equations is usually over-constrained, i.e., the number of face points is far greater than the number of control points approximating the face-point curve. If the number of face points is M, this over-constrained linear system can be written as:

$$\begin{pmatrix} P_0 \\ P_1 \\ \vdots \\ P_M \end{pmatrix} = \begin{pmatrix} B_0(u_0) & B_1(u_0) & \cdots & B_N(u_0) \\ B_0(u_1) & B_1(u_1) & \cdots & B_N(u_1) \\ \vdots & \vdots & \vdots & \vdots \\ B_0(u_M) & B_1(u_M) & \cdots & B_N(u_M) \end{pmatrix} \begin{pmatrix} X_0 \\ X_1 \\ \vdots \\ X_N \end{pmatrix}$$

This is an over-constrained linear system and can be solved using traditional numerical techniques. Multiple linear constraints, such as fixing a set of control vertices at specific locations, may be added in a straightforward manner. Thus, once we have assigned parameter values to the data points the problem reduces to the numerically simple one of solving a set of linear equations. There are a number of known techniques that have been proposed for assigning parameter values to the data points.

For our application we have chosen to use the arc length metric for assigning parameter values to these face points. This assigns to each face point a value of u that is equal to the ratio of the length of the curve up to that point to the total length of the curve. The length of a face-point curve (or section thereof) is easily calculated based on the distances between successive face points (i.e., the chord length). While this is an approximation to the true length of the curve, it is a satisfactory one if the curve is well sampled along its length. This parameterization method works well in practice. Below we will discuss methods for maintaining a uniform sampling of face-point curves.

Based on the parameter values, we fit the face-point curve with a uniform B-spline curve of known resolution (i.e., N). This resolution is interactively chosen by the user. This choice allows the user to determine how closely a B-spline curve must approximate the surface curve for an editing operation. If the user wishes to smooth the surface curve by a substantial amount, a coarse B-spline curve (i.e., fewer control vertices) could be chosen. In this case the B-spline approximation will be much smoother than the surface curve and hence the resulting smoothing operation will create a much smoother surface curve. Similarly, a larger number of control vertices for the B-spline approximation results in a much closer fit to the surface curve and hence the resulting smoothing is subtle. The next section briefly discusses further details of editing face-point curves with B-spline curves.

3-D B-spline Curve Based Editing

The preceding section outlined the process of obtaining a B-spline space curve from a face-point curve. In practice, the least squares fitting and smoothing method outlined in the last two sections can be performed at interactive speeds even for large polygonal meshes and dense face-point curves. This allows the user flexibility when using the smooth approximating space curve to perform curve editing. Coarser resolutions allow large scale smoothing (and editing) while higher resolutions allow the fine tuning of face-point curve placement. Editing is straightforward: the user manipulates either a control vertex or an edit point of the B-spline curve. This updates the location of the B-spline curve which in turn updates the surface curve based on the procedure CurveAttract discussed earlier. In practice all the standard methods for editing and controlling B-spline curves may be used in the above process. Examples include manipulating tangents and acceleration vectors at edit points.

The method has a several advantages. First it runs at interactive speeds even for large meshes because the curve smoothing algorithm uses only local surface information to accomplish smoothing, i.e., only those polygons that are actually touched by the face-point curve need be traversed during each smoothing step. A second feature of the algorithm is that it uses traditional B-spline curve editing techniques. This is a well-studied area and various commercial software packages provide a number of powerful tools to manipulate B-spline curves. Thus a modeler can use a powerful and familiar set of tools to manipulate the surface curve indirectly through the space curve while still benefitting from the additional intuition offered by a surface curve. Fine details may be edited by using more control vertices in the B-spline curve while coarse geometry can be editing using a smaller number of control vertices.

In the preceding discussion one could also imagine using well-known curve representations (i.e., basis functions) such as a wavelet or a hierarchical B-spline representation. The smoothing and editing techniques outlined above work with any underlying basis function for the space curve. In each of these cases the underlying mathematical structure of the space curve representation is inherited by the surface curve. We have chosen a uniform B-spline basis function because it is the representation of choice for most popular modeling packages.

SURFACE SNAKES: MINIMUN ENERGY SURFACE CURVES

Although the curve editing paradigm outlined in the previous section has a number of advantages over known curve editing techniques, it retains some shortcomings that are inherent to the space-curve approach to curve editing. To overcome the shortcomings, the preferred embodiment of the present invention provides a technique for direct manipulation of surface curves on dense meshes. We call this the surface snake framework. A surface snake may be thought of as an energy-minimizing surface curve, i.e. a surface curve together with a higher order structure that can be conceived as its energy. The energy of a surface snake is a combination of internal and external components. In the absence of external constraints a surface snake tends to minimize just its internal energy. As external constraints are added, the surface snake attains an energy state that minimizes both internal and external energy constraints. Using the surface snake framework, curve editing tools are provided that enable the user to edit surface curves by directly selecting and moving on the surface an arbitrary section of the curve. The curve section deforms on the surface while staying continuous with the rest of the surface curve. Because the user directly manipulates the surface curve, the editing operation is intuitive. Furthermore, the surface snake formulation ensures that the editing operation is robust with respect to abrupt changes in surface curvature and geometry.

Formulating Snakes for Polygonal Surfaces

The surface snake formulation differs in several significant ways from the 2-D snake formulation of Kass et al. Surface snakes are curves in a 3-D ambient space, while the contour curves of Kass et al. are curves in a 2-D ambient space. Surface snakes, however, are not the generalization of contour snakes from 2-D to 3-D. While surface snakes are constrained to the 2-D surface boundary of a 3-D object, the contour curves of Kass et al. are not constrained to the 1-D contour boundary of the 2-D object. Therefore, the contour snakes of Kass et al. are the 2-D analog of space curves, not the 2-D analog of surface snakes. In addition, surface snakes are represented as face-point curves on dense polyhedral meshes embedded in a 3-D ambient space, while contour snakes are represented as polylines in the 2-D Euclidean space of a pixel image. Moreover, surface snakes are constrained to a submanifold of the ambient space (i.e., constrained to lie on the surface of the polygonal mesh) while still satisfying the minimum energy criteria, while contour snakes are not constrained to any submanifold of the ambient space. Because an energy minimizing deformation of a curve in 3-D space does not, a priori, constrain it to the surface, it is considered one of the key features of the present invention that the minimization of the curve energy is subject to the constraint that the surface snake remains on the polygon mesh. The surface snake formulation also involves a reformulation of the snake energy terms for the face-point curve representation.

We use a controlled continuity spline to model our surface curves. The internal and external $$E_{surf\text{-}snake} = \int_0^1 E_{internal}(v(s)) + E_{surf}(v(s)) + E_{constraint}(v(s))ds \quad (5)$$

where $v(s)=(v_x(s), v_y(s), v_z(a))$ is the parameterized snake embedded in 3-d Euclidean space. The $E_{image}$ term of the 2-D formula for contour energy is replace here by $E_{surf}$ to indicate surface-based constraints (rather than image-based constraints). The surface curve acts autonomously to correct its own shape by finding a minimum to the energy functional. Before we can use this formulation we must address two issues. In the following discussion we use the formulation for $E_{internal}$ to clarify both these issues. The other energy terms generalize in a similar fashion. The previous discussion examined the two components of the internal energy for a curve in $\Re^2$. Our curves are face-point curves: these are essentially curves in $\Re^{93}$ with the additional constraint that they lie on the polygonal mesh surface. Consider equation 2 in the context of a face-point curve. The first order term minimizes the integral of the tangent at each point along the curve. By definition, the tangent vector of a surface curve is tangent to the surface. Therefore for purposes of evaluating the first order term we may ignore the surface constraint.

The second order term does not generalize to surface curves in as straightforward a manner. One intuition for this term is illustrated in FIG. 5. C1 is a surface curve with non-zero curvature $v_{ss}$ in space at the point 52. However, note that the tangential component of $v_{ss}$ on the surface is zero. This implies that at the point 52, C1 already minimizes curvature on the surface despite the fact that it has a non-zero curvature in the 3-D ambient space. Now consider C2, another curve on the same surface. The curvature $v_{ss}$ in space of C2 at the point 54 is non-zero. Note, however, that the tangential component of $v_{ss}$ is non-zero as well. This example illustrates that it is the component of the curvature that is tangential to the surface that we are interested in minimizing. Whichever path a curve takes on a surface, at each point on the curve its curvature vector $v_{ss}$ will in general have a component $N_{surf}$ that is normal to the surface at that point. This vector is actually the curvature of the surface itself along the tangent to the curve at that point. Therefore a minimum energy surface curve may possess a non-zero normal component to its curvature at each point along its length. As before, this component corresponds to the curvature of the surface along the direction of the tangent to the minimum energy curve at that point. Thus the normal component of a surface curve's curvature is a function of the underlying surface. As such, it is unavoidably non-zero if the surface has non-zero curvature. Therefore, the second order term of the internal energy should only penalize the component of the surface curve's curvature that is tangent to the surface, i.e., $v_{ss}\backslash N_{surf}$, where $\backslash$ is a binary operator defined as follows:

$$v1\backslash v2=v1-\{v1\cdot v2/v2\cdot v2\}v2$$

This ensures that $(v1\backslash v2)\cdot v2=0$, i.e., that $v1\backslash v2$ is the vector obtained by subtracting from $v1$ its component in the $v2$ direction. With the foregoing discussion in mind the internal energy can now be written as:

$$E_{internal}(v(s))=\alpha(s)|v_s|^2+\beta(s)|v_{ss}\backslash N_{surf}v(s))|^2 ds \quad (6)$$

where $N_{surf}v(s))$ refers to the normal to the surface at the surface point corresponding to the point on the curve given by $v(s)$. For convenience, in the following discussion we will continue to use $v_{ss}$ to explain our surface curve implementation. In light of the foregoing discussion, however, this term should be interpreted as the component of the curvature vector tangent to the surface, i.e., as $v_{ss}\backslash N_{surf}$.

Note that equation 6 does not explicitly ensure that the curve will remain on the surface. Rather it only ensures that the energy of the surface curve is computed in a meaningful manner. Thus, even after this generalization, we still have the problem of constraining the curve to the surface. One method for imposing the additional surface constraint could be to add a mathematical condition to equation 6 that accomplishes the desired effect. This is a reasonable option if the surface has a global parameterization (e.g., the surface can be described as the set of points P satisfying a surface equation F(P)=0). In this case one could substitute the curve equation into the surface equation (i.e., F(v(s))=0) and optimize the curve with this as a constraint. However, polygonal meshes and other unparameterized surfaces do not have a closed form equation that describes them. Given our curve representation as a series of face points, we have discovered that an effective method of imposing the surface constraint is to ensure that each of the individual face points of a curve always stays on some face of the polygonal mesh even as the curve moves towards its minimum energy configuration.

SURFACE SNAKES: AN IMPLEMENTATION

The problem posed by equation 6 is a problem in the calculus of variations. Practical algorithms that solve such variational problems come in two flavors: the finite difference approach and the finite element approach. The finite difference approach starts by considering an equivalent statement of equation 2 as a set of differential equations. These come from a mathematical result in the calculus of variations that shows that a curve that minimizes equation 2 also minimizes the set of differential equations (the Euler equations) given by:

$$E_{Euler}(v) = d^2\beta v_{ss}/ds^2 - d\alpha v_s/ds = 0 \qquad (7)$$

For the sake of simplicity we are considering here just the internal energy terms. We extend the formulation to include other kinds of energy terms later.

Finite difference approaches approximate the continuous solution to the Euler equations using a set of discrete difference equations. This strategy reduces the curve representation to a set of points in space. Therefore, we lose the original continuity of the solution. However, it is a computationally simple and an easily extensible approach.

A second approach to solving our minimum energy equation is the finite element method. In this case the desired solution is represented as a weighted sum of a set of carefully chosen basis functions. The optimization process seeks to find the optimal set of weights (for these basis functions) that would result in a minimum energy solution. Known techniques on deformable curve and surface design provide examples of using the finite element technique to create minimum energy curves and surfaces. For our application, a finite element solution would require that we construct an appropriate set of smooth basis functions over an irregular, unparameterized polygonal manifold. This is a challenging task in itself and remains an open problem. A variation of this strategy could be to use basis functions in $\Re^3$ (i.e., no surface constraints). However, this strategy would ultimately have to resort to creating projections of space curves on the polygonal surface. This solution is not acceptable to us since it runs counter to our original reasons for creating a surface curve formulation (i.e., that projection in general is non-robust and could lead to un-intuitive interactions). We have therefore chosen to use a finite difference solution in the preferred embodiment of the invention.

A Finite Difference Solution

Our goal is to generate a minimum energy face-point curve given a set of user-imposed constraints and perhaps a set of surface-based constraints. Our solution strategy is to find the discretized version of the Euler equations and solve the resulting difference equations for our solution. For simplicity, and without loss of generality, we explain the minimization process using only the stretching and bending energy terms (a curve's internal energy). Once our basic solution paradigm is explained we may extend it in a straightforward manner by adding other energy terms.

Given just the stretching and bending terms of equation 6 the corresponding Euler equations are as given in equation 7. The discrete form for the internal energy terms is written as follows:

$$E_{internal}(v) = \sum_i E(v(i)) \qquad (8)$$

where v(i) is the $i^{th}$ face point and the summation is assumed to be over the face points of the surface curve. Approximating the derivatives with their corresponding finite difference approximations, the energy contribution of the itb face point is given by:

$$E(v(i)) = \alpha_i \|v_i - v_{i-1}\|^2/2h^2 + \beta_i \|v_{i-1} - 2v_i + v_{i+1}\|^2/2h^4 \qquad (9)$$

where h is the sample spacing (assumed here to be uniform).

The discrete version of the Euler equations (for an individual face point) is therefore given by the discrete version of equation 7:

$$\begin{aligned}E_{Euler}(v(i)) = &\beta_{i+1}(v_i - 2v_{i+1} + v_{i+2}) + \beta_{i-1}(v_{i-2} - 2v_{i-1} + v_i) - \\ &2\beta_i(v_{i-1} - 2v_i + v_{i+1}) - (\alpha_{i+1}(v_{i+1} - v_i) - \\ &\alpha_i(v_i - v_{i-1})) \\ = &0\end{aligned} \qquad (10)$$

Note that we have dropped the denominators from the expressions for the discrete derivative and curvature in this equation. In reality, these weights affect the relative importance of the first and second terms; however, in our discussions we will subsume these weights into the β's. In two dimensions the above equation can be conveniently expressed in the form of a matrix equation that may be solved using an implicit Euler method. What is worth noting here is for our implementation, a matrix based solution cannot factor in the point-on-surface constraint. Our iterations must therefore be explicit Euler iterations, i.e., we must explicitly enforce the surface constraint at each iteration step.

We use an explicit iterative solution that at every iteration displaces each face point of the surface curve by some distance on the surface to a new displaced face point of a displaced surface curve. When we start the minimum energy iteration the internal energy of the curve is non-zero. The exact numerical value is given by the value of $E_{Euler}$. The displacement (direction and distance) moved by the surface-snake on the polygonal mesh is computed so that the value of $E_{Euler}$ is reduced at each iteration step. The iteration proceeds in this manner until the surface curve reaches its minimum energy configuration. There are two steps in our iterative energy minimization process (which is essentially a relaxation process):

First, based on the expression for $E_{Euler}$ we infer a displacement $dv_i$ for each individual face point $v_i$ on the face point curve v.

Second, we calculate a new displaced face-point curve v'=v+dv, which may be thought of as the curve resulting from sliding the face points $v_i$ to new positions $v_i'$ on the surface, according to the computed displacements $dv_i$.

The distance and direction $dv_i$ to be moved by each face point at each iterative step is computed from a "force" acting on the individual face points. We call the set of forces computed from the expression for $E_{Euler}$ the variational Euler forces.

No prior work on surface curves has attempted a formulation or solution to this kind of variational problem. It is worth noting that, where possible, an implicit Euler solution such as the one exemplified by Kass et al. is preferable for reasons of efficiency over an explicit solution such as ours. However, as noted earlier, accommodating the additional constraint of keeping our curves on the polygonal mesh surface while using this solution is an unsolved problem.

The first step in our solution then is to decompose the discretized Euler equations into a set of forces on individual face points. We rewrite equation 10 for $v_i$ as follows:

$$E_{Euler}(v(i)) = -(\alpha_i F_{i,i-1} - \alpha_{i+1} F_{i,i+1} - 2(2\beta_i C_i - \beta_{i-1} C_{i-1} - \beta_{i+1} C_{i+1})) \quad (11)$$

where $F_{i,j} = v_j - v_i$, $C_i = \{v_{i+1} + v_{1-1} - 2v_i\}/2$, $F_{i,i-1}$ is proportional to the discrete backward tangent at $v_i$, $F_{i,i+1}$ is proportional to the discrete forward tangent at $v_i$ and $C_i$ is proportional to the discrete curvature at $v_i$ (assuming the sample spacings are uniform). At some intermediate stage of our iterative energy minimization process the above expression is non zero. In order to reach equilibrium (i.e., zero out the expression) we propose to exert a force $F_{resultant}(i)$ on the i-th face point that would allow the face point to reach its minimum energy state. $F_{resultant}$ is given by:

$$F_{resultant}(i) = -E_{internal}(v(i)) \quad (12)$$

$$= \alpha_i F_{i,i-1} + \alpha_{i+1} F_{i,i+1} +$$

$$2(2\beta_i C_i - \beta_{i-1} C_{i-1} - \beta_{i+1} C_{i+1})$$

We can now interpret each of the five discrete terms in the above equation as individual component forces acting on the face point $v_i$. We call these five forces the variational Euler forces to indicate that they are derived from the variational equations corresponding to our minimum (internal) energy curve equation. FIGS. 6A and 6B illustrate the intuition for these forces. As shown in FIG. 6A, the discrete forward tangent $F_{i,i+1}$ moves $v_i$ towards $v_{i+1}$ and the discrete backward tangent $F_{i,i-1}$ moves it towards $v_{i-1}$. As shown in FIG. 6B, the curvature force $C_i$ moves $v_i$ towards the midpoint of the line connecting its two neighboring points, $v_{i-1}$ and $v_{i+1}$.

FIG. 7A shows the resultant of the first two terms (i.e., the membrane term) from equation 11. The force vector corresponding to this resultant is a linear combination of the forward and backward tangent vectors. If $\alpha_i + \alpha_{i+1} = 1.0$ then (at least in two dimensions) the resultant will move $v_i$ to a point 56 on the line joining its two neighbors $v_{i-1}$ and $v_{i+1}$. Similarly, the resultant of the last three variational Euler forces represents the force due to the thin plate term. FIG. 7B illustrates the intuition for this term when $C_i=0$. This force makes the curve locally curvature continuous to the neighboring curve segments. This force attempts to make the curve at $v_i$ locally curvature continuous to the neighboring curve segments. The final position of $v_i$ is shown as 58.

Note all these forces are defined in Euclidean space, i.e., they do not encode our knowledge of surface geometry. We use only the component of these forces that lies on the local tangent plane of the surface, i.e., on the plane containing the face to which the face point belongs. This projected force is used to move the surface point to a new location in the face. If the force is sufficiently large that it pushes the face point to the edge of the face, a new force can be computed that is projected onto the adjacent face and this force can continue to displace the point along the surface of the new face.

To summarize our basic surface snake formulation: each energy minimization term is reduced to a set of appropriate displacement forces acting on individual face points of our surface curve. The components of these displacements that are tangent to the surface are used to slide these face points over the surface to their new positions on the surface. At equilibrium, the resultant tangential displacement on each face point is zero and the surface snake reaches its desired minimal energy state. It should be noted that the displacements of certain points can be set to zero, thereby fixing or anchoring certain points of the surface curve, while allowing others to move.

Setting the Continuity Control Functions

An important issue to address in our energy minimization strategy is what the continuity control functions (i.e., the weights $\alpha_i$ and $\beta_i$) should be. Varying the relative strengths of these functions controls the "stiffness" of the curve. In an interactive environment, it is desirable to provide user control over this parameter. One method to provide the user control over curve stiffness is to offer local control over the value of $\alpha_i$ and $\beta_i$ for each face point. While this is straightforward to implement, it provides a cumbersome interface to the user. In the preferred embodiment, we make the assumption that both $\alpha_i$ and $\beta_i$ are constant functions over the length of some section of the curve, i.e., $\alpha_i=\alpha$ and $\beta_i=\beta$ for all i. Varying $\alpha$ and $\beta$ now controls the stiffness of the entire curve section. For this curve section equation 12 can now be re-written as:

$$F_{result}(i) = \alpha F_{i,i-1} + \alpha F_{i,i+1} + 2(2\beta C_i - \beta C_{i-1} - \beta C_{i+1}) \quad (13)$$

$$= 2\alpha C_i + 2\beta(2C_i - C_{i-1} - C_{i+1}).$$

Since $F_{i,i-1} + F_{i,i+1} = 2C_i$, we can further re-write this equation as:

$$F_{result}(i) = K_{fair} F_{fair}(i) + K_{curvature} F_{curvature}(i) \quad (14)$$

where $K_{fair}=2\alpha$, $K_{curvature}=2\beta$, $F_{fair}=C_i$, and $F_{curvature}=2C_i - C_{i-1} - C_{i+1}$. We call $K_{fair}$ and $K_{curvature}$ the new continuity control functions, and call $F_{fair}$ and $F_{curvature}$ the fairness and curvature forces, respectively. From our earlier discussion the fairness force simply represents the membrane energy term. It moves each point to the midpoint of its two neighbors. Similarly the curvature force represents the thin plate energy term. It makes the curve's local curvature continuous with respect to the neighboring curve segments. Our use of the term fairness is motivated by its use in the geometric interpolation literature where the fairness of an interpolating curve or surface is a measure of its smoothness.

Note that the fairness and curvature forces have potentially conflicting goals. The fairness term attempts to minimize the length of the curve. Intuitively, this means that it straightens out curved parts of the face-point curves (at least to the extent that it can become straight while remaining constrained to the surface). The curvature term, on the other hand, attempts to make a surface curve's (tangential) curvature continuous over its entire length, i.e., it smooths the curve only to the extent necessary to attain curvature continuity. Equation 14 provides a simple framework for controlling the global curvature properties of a surface curve. Assigning $K_{fair}$ a higher weight produces tight, length minimizing surface curves and assigning $K_{curvature}$ a higher weight produces curves that tend to be smooth and yet retain their existing curvature properties (i.e., a highly "curvy" surface-curve is likely to retain its high curvature properties in an equilibrium state).

FIGS. 8A, 8B, and 8C show an example where the relative weights of the curvature and fairness term are varied for a surface curve. This particular editing scenario illustrates the flexibility offered by the surface snake formulation. The point $v_i$ and the two end points of the surface curve are constrained to be fixed during the energy minimizing iteration of the surface snake and the weight of the curvature term $K_{curvature}$ is varied. The figures show the final state of a relaxation iteration for different values of $K_{curvature}$. When $K_{curvature}$ is zero, as shown in FIG. 8A, only the membrane (fairness) term is active. The resulting curve behaves like a tight elastic band passing through $v_i$ and the two end points. The curve has a discontinuous first derivative at $v_i$. When $K_{curvature}$ increases to 0.5, as shown in FIG. 8B, the curve behaves more like a stiff wire (thin plate) and distributes its curvature over the entire curve. FIG. 8C shows the case where $K_{curvature}$ is set to 1, and the curve is very stiff.

Creating Uniformly Sampled Surface Snakes

When dealing with discretized curves it is important to ensure that the curves are adequately sampled along their length. A curve that has an irregular distribution of points over its length is liable to miss detail in sparsely sampled regions. More importantly, since our snake-based energy computations are made only at the discrete set of face points, an irregular sampling leads to an inaccurate estimate of snake energy. This inaccuracy, in turn, can adversely affect surface snake based editing operations.

FIG. 9 illustrates these problems with an example. The figure shows an irregularly sampled surface curve 60 on a planar cross-section 62 of a surface. This curve minimizes the resultant due to the variational Euler forces. Note, however, that the curve is an aliased representation of the underlying surface cross section because it is not uniformly sampled along its length. Secondly, since the sampled curve is an aliased representation of the underlying surface section, the snake energy terms for the curve are incorrectly computed. This in turn can result in incorrect and non-intuitive editing interactions.

Previous literature on minimum energy 2-D curves has not addressed this uniform sampling problem because the problem simply does not arise in 2-D: the fairness force would move each point towards the midpoint of its neighbors in two dimensions ensuring that the points were evenly distributed over the length of the curve. It is with the addition of the curve-on-surface constraint that the non-uniform sampling problem is introduced.

The present invention solves the problems associated with non-uniform surface snake sampling by adding an additional force term to the minimum energy snake formulation. This force moves each face point so that it stays equidistant from its neighbors in the surface-curve. We call this the snake arc length force term. A desirable characteristic for the arc length term is that it should not change the actual character or shape of the curve itself. Rather it should simply redistribute the face points of the surface curve so that they are evenly spaced.

FIG. 10 provides the intuition in two dimensions for the arc length term. The figure shows a section of a face-point curve 64 in two dimensions. The goal is to move $v_i$ to a new location, such that (1) it becomes equidistant from its neighbors $v_{i-1}$ and $v_{i+1}$ and (2) it minimally alters the shape or character of the curve. P0, P1, P2 and P3 show four candidate destination locations. They all satisfy the first criterion since they lie on the perpendicular bisector of the chord joining $v_{i-1}$ and $v_{i+1}$. P3 is selected to fit a non-local higher order (polynomial) curve through the points and redistribute points on the surface according to this curve. However, this strategy has a problem: the fitted curve would have to once again be projected to the surface. As pointed out earlier curve projection is a non-robust operation in general. In addition, P3 significantly alters the shape of the curve. P0 is selected as the midpoint of $v_i$'s neighbors. Moving $v_i$ to P0, however, would smooth out the curve section excessively. P1 and P2 are two viable alternatives for a new location of $v_i$. In the preferred embodiment of the invention, the arc length term chooses P1 to be the new destination for $v_i$. Moving the face point directly towards its more distant neighbor (i.e., $v_{i+1}$) produces good results. This strategy introduces a certain minimal local smoothing of the curve but tends to preserve the global shape and character of the curve.

In view of the above, we compute the arc length force as follows:

$$F_{arc}(v_i) = |\|F_{i,i-1}\| - \|F_{i,i+1}\|| \|t_{max}/\|t_{max}\|\| \tag{15}$$

where $t_{max}$ is the larger (in magnitude) of $F_{i,i-1}$ and $F_{i,i+1}$. If the magnitudes of the forward and backward tangents happen to be equal the arc length force is zero.

Using the arc length constraint within the surface snake minimum energy iteration is implemented by simply adding the arc length force to the variational Euler forces. The minimum energy iteration then automatically ensures that the surface curve has a uniform distribution of face points along its length.

Note that a more efficient representation for surface curves might be one that has a lower number of sample points in regions of lower surface curvature (and a higher concentration of face points in regions of higher surface curvature). As explained, our solution uses uniformly sampled curves that are sampled at dense enough resolution that two adjacent face points are either on the same face of the mesh, or on adjacent faces. Therefore, in flat areas of the surface we might be using more face points than are actually necessary to accurately represent the surface curve. An adaptive representation might be more economical with regard to memory usage. However, in practice this is not a significant enough savings to warrant a non-uniform representation for the situations we have encountered in our areas of application. Furthermore, a non-uniformly sampled surface curve would have to be dynamically updated with regard to face-point distribution as it moved over the surface geometry. In contrast a uniform surface curve representation is trivial to maintain and update. For these reasons we have chosen to use a uniform surface curve representation over a non-uniform (i.e., adaptive) one.

SPEEDING UP THE SURFACE SNAKE IMPLEMENTATION

The previous section described a straightforward implementation of the surface snake formulation: at each iteration step compute the resultant force on every face point and move that face point to a new position on the surface, then continue this iteration (which is essentially a relaxation process) until a minimum energy configuration is reached.

While this is a reasonable relaxation strategy, it is not a particularly efficient one for the density of our underlying data sets. Recall that we chose our face-point curve's sampling rate to be such that two face points were separated on average by no more than the width of one polygon.

Therefore, a dense underlying polygon mesh will in turn require that the face-point curves be densely sampled. The straightforward surface snake implementation on dense face-point curves gives rise to flaccid or unresponsive surface snakes, i.e., shape changes of the snake propagate slowly. Note that this problem is distinct from the one of maintaining a surface snake that adapts to surface curvature. The cause for this inefficiency is easily understood with the help of an example. Consider an editing operation where a user pulls on one end of the snake to move the end point to a new location on the surface, i.e., an edit that creates an impulse at one end of the snake. Assuming that the end point that the user pulls stays fixed to its new location on the surface, our surface snake must now attain a new minimum energy state through the snake relaxation process. For the snake to reach this state the effect of the editing operation must be allowed to propagate throughout the length of the snake. We call this the impulse propagation cost for a surface snake since it measures the time an impulse at one end of the snake takes to propagate throughout the length of the snake.

Consider the impulse propagation cost for a simplistic relaxation process. Since each minimum energy iteration propagates the impulse by at most 2 face points (the curvature term affects up to two neighboring face points) it takes $O(N/2)$ iterations for the effect of the editing operation to reach the other end of the snake. Since the cost per relaxation iteration is N, the cumulative computational cost for the impulse to reach the opposite end of the snake is $O(N^2)$. Note that this cost still does not measure the number of iterations beyond these $O(N^2)$ steps that are needed to reach a minimum energy state. It merely measures the time for an impulse at one end of the snake to reach the other end. In practice, several of these $O(N^2)$ impulse propagation steps will be needed to achieve the final equilibrium state of the surface snake. However, the impulse propagation cost is a reliable measure of the computational complexity of the snake relaxation process since the impulse propagation process is central to every minimum energy iteration.

It is worth noting that in the absence of a surface constraint the impulse propagation cost could be reduced to $O(N \log N)$ simply by using an implicit matrix based solution similar to the one employed by Kass et al. However, we cannot use this solution strategy because it would mean compromising the curve-on-surface constraint which is essential to intuitive curve editing.

To make our surface snakes more rigid and responsive, a faster implementation of our minimum energy iteration is necessary. We propose a coarse-to-fine relaxation procedure that works as follows: for every face point on the surface snake we compute the forces on that face point based on a hierarchy of resolutions of the surface snake. To better understand this computation, let us consider the forward and backward tangent forces on the $i^{th}$ face point $v_i$ based on this hierarchy of resolutions of a surface snake. FIG. 11 provides an intuition for these forces. The figure shows the forces on a face point $v_i$ of the snake due to its immediate neighbors at three different resolutions of the snake: 0, 1 and 2. The resultant force due to the "neighbors" of $v_i$ is a weighted combination of the forces at the different resolutions of the snake. These forces are then used in the snake minimum energy relaxation. The resulting snakes are more "rigid" and responsive than snakes produced by a static relaxation process. In the figure, resolution 0 is the default resolution of the surface snake (i.e., the highest resolution). It has $N_0$ face points. For purposes of force computation, resolution R of the snake has $N_R = N_0/2^R$ face points (i.e., we drop every other face point as we increase R). At resolution R, the force on $v_i$ due to the face point on the immediate "left" is labeled $F^R_-$ and the force due the neighbor on the immediate "right" of $v_i$ is labeled $F^R_+$. The resultant force $F^{result}_-$ on face point $v_i$ from the left is now given by a weighted combination of the forces from the left at all the resolutions of the snake, i.e., $$F^{result}_- = w_0 F^0_- + w_1 F^1_- + w_2 F^2_- + w_3 F^3_- + \ldots + w_M F^M_- \qquad (16)$$

where $M = \log_2(N_0)$. A similar expression can be written for the resultant force from the right of $v_i$. The weights are computed so that the coarser the resolution of the snake, the smaller the weight of the forces at that resolution. We have used the following weighting mechanism.

$$w_R = w_0/(2^R$$

The variational Euler forces on $v_i$ are now computed based on these resultant forces. For example, the fairness force on $v_i$ is now given by:

$$F_{fair}(i) = F^{result}_-(i) + F^{result}_+(i)$$

The other variational Euler forces are computed in a similar fashion to the one above. In practice, this coarse-to-fine computation is computed by simply selecting out the appropriate face points from the high resolution snake. Thus it is not necessary to explicitly compute a number of resolutions of the snake for every single face point $v_i$. The coarse-to-fine snake computations can therefore be implemented efficiently.

Let us now consider the computational gains obtained due to our coarse-to-fine relaxation process. Computing Eulerian forces in the manner shown in equation 16 implies that the effect of an impulse at any point of the surface snake is immediately propagated to every other point on the curve in the very first iteration. However, the cost of each force computation is now $O(\log N_0)$ (there are $\log N_0$ terms in equation 15). Therefore the total impulse propagation cost to our coarse-to-fine iteration is $O(N \log N)$.

Thus, instead of the $O(N)$ iterations of cost $O(N)$ each that were required to propagate an effect in the static implementation (i.e., computations based on just the highest resolution), we now need only a single iteration of cost $O(N \log N)$. Because of this, snakes that use our coarse-to-fine iteration strategy achieve their minimal energy configuration an order of magnitude faster than fixed resolution snakes. In practice this speedup makes our surface snakes rigid and responsive which in turn makes them usable in an interactive setting.

APPLICATIONS OF SURFACE SNAKES

The previous sections described an efficient implementation of our surface snake formulation. We now explain how our our base surface snake formulation can be extended to include external energy constraints (i.e., $E_{constraint}$ from equation 5) as well as surface based energy constraints (i.e., $E_{surf}$ from equation 5). We discuss implementations of two specific extensions of our base surface snake formulation to illustrate each of these kinds of constraints. The first extension adds user-defined constraints to the formulation that enable a user of the system to perform editing operations directly on the surface curve. The second extension enables the user to manipulate surface curves using arbitrary scalar fields defined on the surface. We demonstrate this using the example of surface color as scalar values at every mesh vertex. It will be appreciated that vector fields defined on the surface may be implemented as well.

Recall that the surface snake may be considered a controlled continuity spline whose internal energy terms are based on a combination of a membrane and a thin plate term. Our solution strategy converts the discretized variational form of the surface snake's minimum energy equation (equation 5) into a set of forces acting on individual face points. These forces are in turn used in an iterative procedure that pushes the surface snake into its minimum energy configuration.

It is straightforward to see that any new energy measures that are different from the ones our surface snakes already possess could be added to our solution using the strategy outlined above, i.e., First, add the energy measure to the existing thin plate and membrane energy terms.

Second, derive the discrete variational form of the new minimum energy equation.

Third, compute a new set of forces on individual face points based on the discrete Euler equations.

However, since we eventually use a force based relaxation strategy a simpler alternative is to bypass the first two steps and directly derive a new set of forces based on our intuitions for the energy measure being included. In the next two sections we have employed this last strategy for the two extensions mentioned above.

Curve Editing with Surface Snakes

Figure 12A:
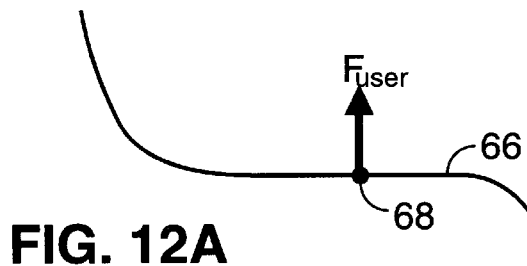

Using techniques of the present invention, surface snakes can be edited in ways that behave like conventional 2-D snake editing. For example Kass et al. discuss the use of "volcanos" (a radial vector field originating at a point) to influence edit snake behavior. FIGS. 12A–12D illustrate our surface snake editing paradigm. First, as shown in FIG. 12A, the user identifies a section of the surface curve 66 that is to be edited. In our system this is accomplished by picking a face point 68 of the surface curve and by specifying a symmetrical length of curve around this face point. We call the picked face point an edit point of the surface snake and the symmetrical section around the edit point an edit section. The edit point can be an arbitrary face point of the surface snake and the length of the edit section can take on an arbitrary value limited only by the length of the surface snake itself. Once the edit point and edit section have been identified, the user pulls on the edit point in an arbitrary direction in screen space. Our system converts this user interaction into a force $F_{user}$ on the edit point that is tangential to the surface at that point. This force now replaces the variational Euler forces at the edit point. It is worth noting that the variational Euler forces are no longer used to move the edit point itself. Rather its movement is dictated solely by the user-specified force. Therefore if the user ceases the application of the force at the edit point, it does not move from its new location on the surface.

Figure 12B:
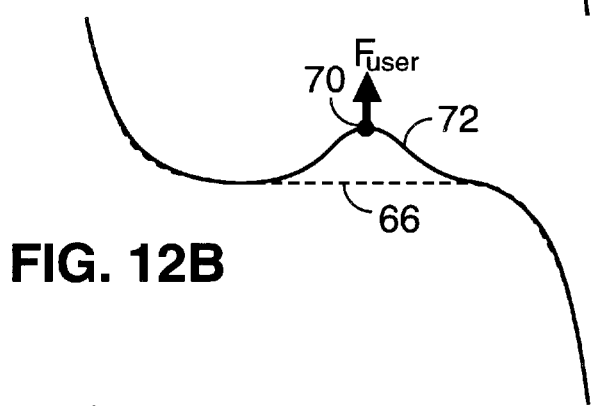
Figure 12C:
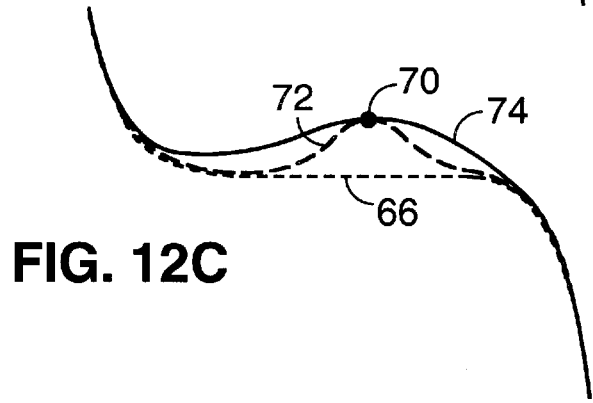

As shown in FIG. 12B, the force applied to the curve displaces the point 68 to a new displaced point 70. The curve 66 in the neighborhood of 68 is also displaced to a new displaced curve 72. Let us assume that the user does not move the point 70 any further. The edit section of the surface curve is then displaced using the relaxation process, as shown in FIG. 12C. During the minimum energy iteration, the two end points of the section are fixed to their original positions on the surface while the edit point 70 is fixed to its user specified location on the surface. This strategy produces a smooth interpolation on the surface of the edit point and the end points of the section, to produce a displaced curve 74 that has minimum energy in the edit section. Only the edit section of the surface curve is modified by this editing operation. Therefore, in a global sense our surface curve no longer satisfies our minimum energy criteria. However, the edit section itself attains a smooth minimum energy configuration under the constraints that its two end points and the edit point are at fixed locations. As before, the user can vary the relative weights of the curvature and fairness terms to modify the shape of the edited curve section. Note that the edit section stays smoothly attached to the rest of the curve, i.e., it maintains $C^1$ continuity at the boundaries of the edit section. It is worth noting that extreme deformations of the edit section can generate a sharp looking corner at the boundaries of the section. This is because our surface-curve representation is discrete. As such if the sampling density is insufficient, high curvature regions of the curve can appear sharp, i.e., as $C^1$ discontinuities.

The curve editing operation described above has two main advantages over the space curve based editing paradigm that we described earlier:

It is more intuitive to use since the user directly manipulates the surface curves rather than through an indirect mechanism such as the manipulation of control vertices of an associated B-spline space curve.

It is more robust to abrupt changes in surface curvature. As explained earlier, if the space curve that is being used for editing purposes does not have a plausible projection on the surface (e.g. at high curvature regions of the surface) the space curve editing paradigm is prone to non-robust behavior.

Figure 12D:
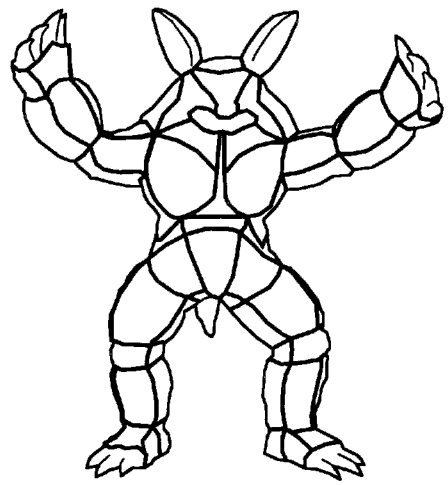

The surface curve editing technique described above can be used to quickly and easily draw feature curves on a 3-D representation of an object, as shown in FIG. 12D. The figure shows an armadillo whose surface is represented by a mesh of about 350,000 polygons (not shown). The polygon mesh was generated by scanning a 15 cm tall clay mold at 1 mm resolution, then processing the raw data from the scan to produce the mesh. The feature curves (shown as thick lines) were added to the polygon mesh using an interactive surface curve editing technique of the present invention. The curves were carefully placed to allow for subsequent animation. The interactive curve placement and editing process took about 2 hours with the bulk of that time being spent on precisely tuning the final location of the surface curves.

Surface snake editing offers another notable advantage over space curve editing: the ability to use surface properties for curve editing purposes. This would be difficult to accomplish with a space curve based editing approach. We discuss this in the next section. Despite the pitfalls associated with space curve editing, the approach does have some advantages. For example, it is a familiar editing paradigm. Furthermore, the problems with space curve based editing approach may be partially alleviated when it is used in conduction with the surface snake formulation. Therefore, in our system we have provided the user with both surface snake based editing tools as well as space curve based editing tools. The user can choose to use either one of these tools (or a combination thereof) to manipulate curves.

Using Surface Color for Curve Editing

In this section we describe a technique for surface snake color attraction. Using this technique a surface snake can be made to conform to a shape defined by color data associated with the polygonal mesh. Although color can be treated as a vector in the context of the present invention, in our discussions we will treat color as a scalar entity. Converting a red-green-blue color value to a scalar can be accomplished in a straightforward way by either using a single color channel or by computing the magnitude of the color vector. As such, our tool may be used with trivial modifications for arbitrary scalar fields defined on the polygonal surface (e.g. Gaussian curvature).

Color attraction has several useful applications. Consider an input polygonal mesh created by scanning in a physical object on which the intended patch boundaries are physically painted on it. Our input in this case would be a dense polygonal mesh with an additional per vertex color. In this situation our color attraction tool allows a user to precisely and quickly position the patch boundary curves based on surface color. Another application of this tool is for creating surface curves that follow in creases or folds (i.e., highly curved regions) of the polygonal mesh. In this case, Gaussian curvature (being a scalar value) may be substituted for color in the color attraction tool. The tool could then be used to automatically attract boundary curves into the required creases and folds on the surface.

Figure 13A:
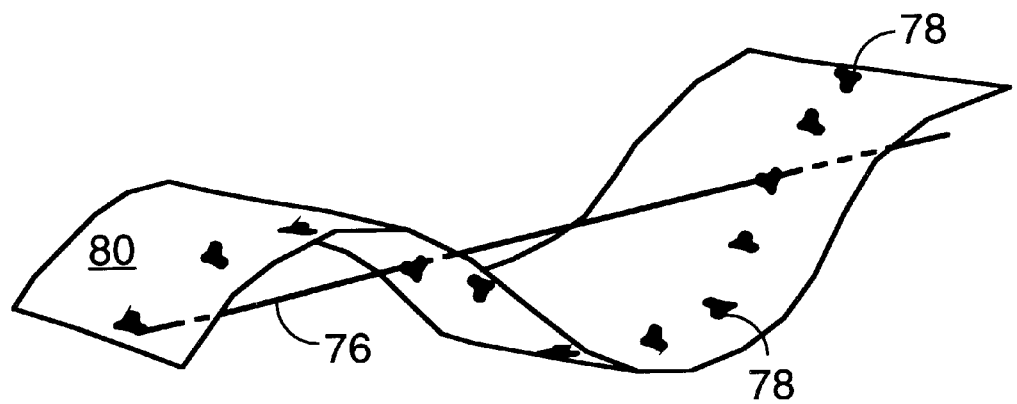
Figure 13B:
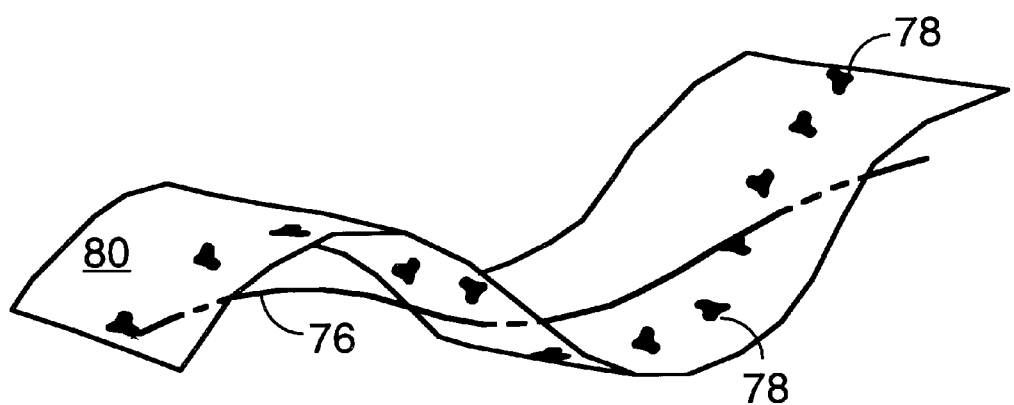
Figure 13C:
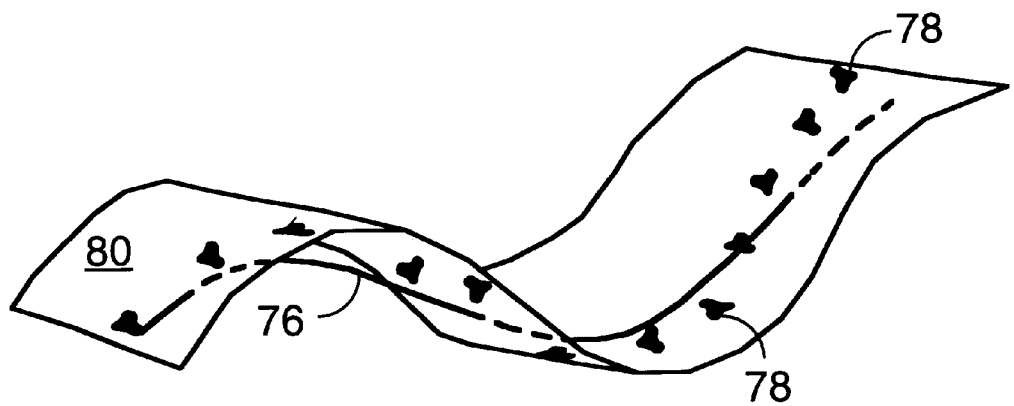
Figure 13D:
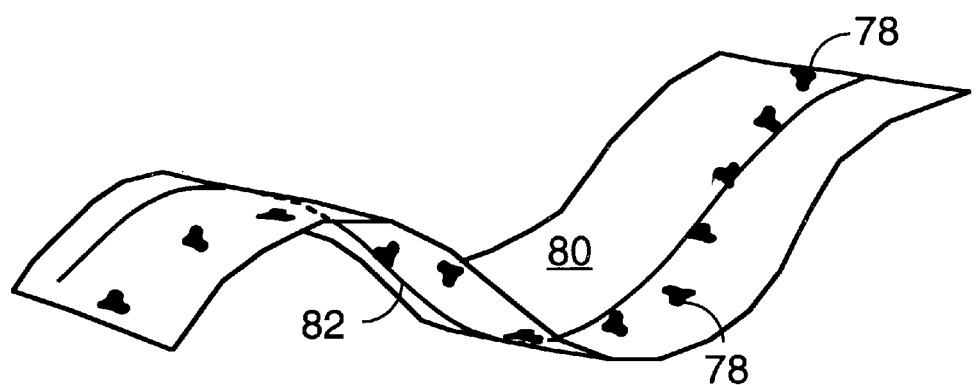
Figure 13E:
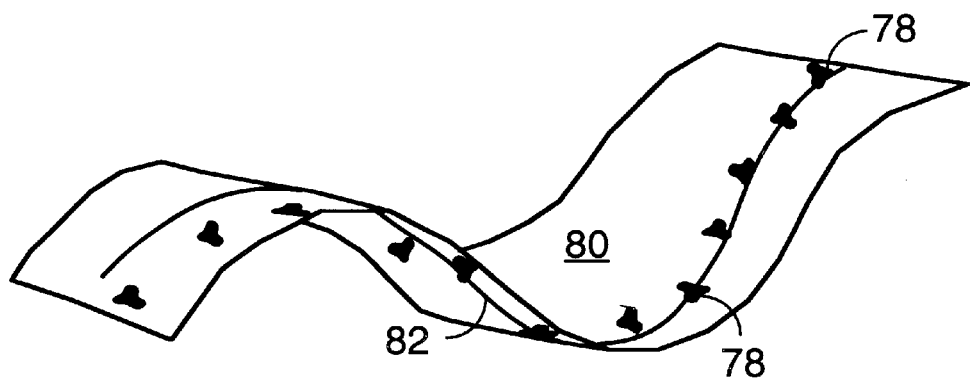
Figure 13F:
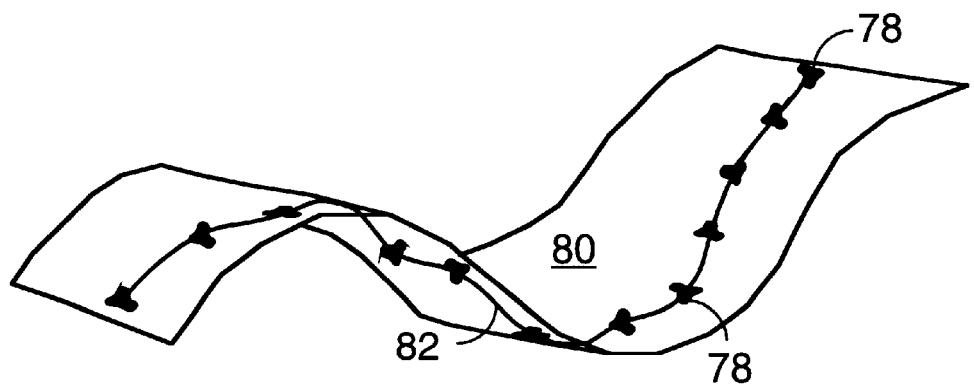

As shown in FIGS. 13A–13F, color attraction can operate with space curves or surface curves. In FIG. 13A a space curve 76 is shown in rough proximity to the position of color data 78 on a surface 80. FIG. 13B shows the space curve after being displaced toward the color, and FIG. 13C shows the space curve after being displaced further toward the color on the surface. In contrast, FIG. 13D shows a surface curve 80 in rough proximity to the position of color data 78 on a surface 80. FIG. 13E shows the curve 80 after it is displaced on the surface toward the surface color. FIG. 13F shows the curve 80 after it is displaced even further toward the color. Note that the surface curve 80 attracts directly to the color within the surface, whereas the space curve 76 moves toward the color, but is not constrained to the surface. Although color attraction is useful in the case of both space curves and surface curves, due to the various advantages of surface curves the preferred embodiment uses color attraction with surface curves.

As before, our method for implementing the color attraction tool works in two steps: first, we derive a new set of color attraction forces (on the individual face points of a surface curve) that capture our intuitions for a desirable minimum energy solution. Second, we use these set of forces in conduction with existing minimum energy forces in our surface snake relaxation algorithm.

In accordance with this two-step approach, let us first focus on the computation of the color attraction forces. Since we would like our surface snakes to conform to underlying surface color, a reasonable strategy for computing these forces might be to attract individual face points to any nearby mesh vertex with a non-zero color value on the polygonal surface. Unfortunately, this straightforward approach produces unstable minimum energy configurations. The reasons for this non-robust behavior are two-fold. First, the magnitude of surface color tends to vary irregularly over the surface. A colored section of the polygonal mesh to which we are attracting our snake is typically a ribbon (of colored vertices) of irregular width rather than a well defined, thin, smooth ribbon of color. Second, since the color data is defined only at mesh vertices the boundary of a colored region tends to have a "jagged" outline.

Figure 14A:
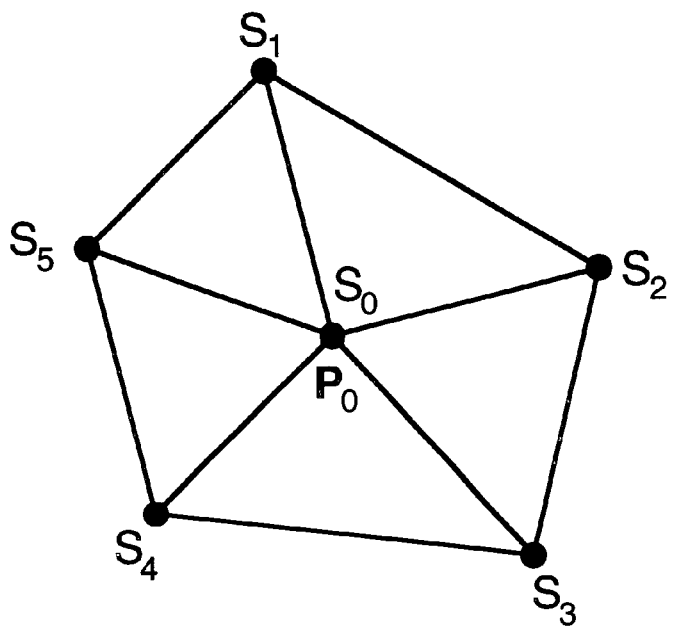
Figure 14B:
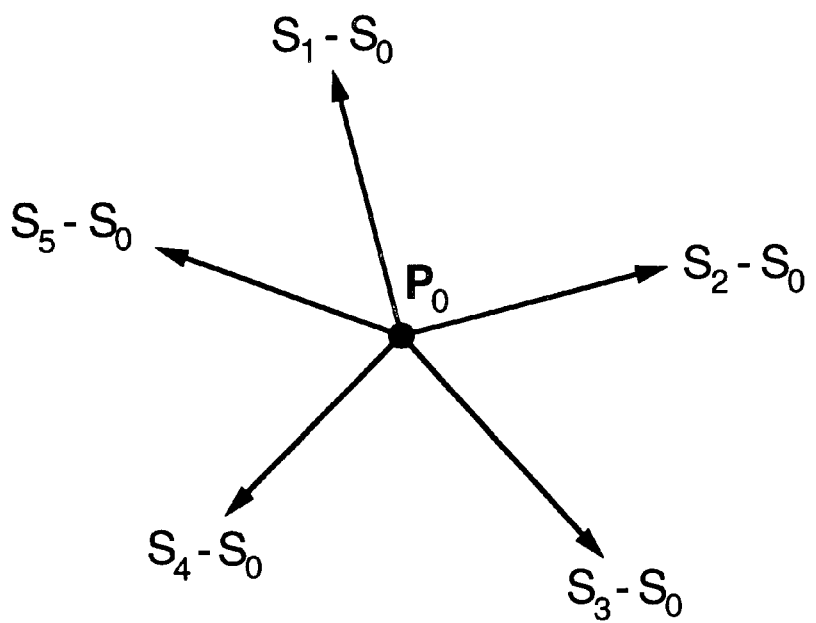

A better solution is to derive a force based on the color gradient. The magnitude of the color gradient establishes the edge (or boundary) of a painted section of the mesh while the direction of the color gradient is used to propel the surface curve into the smooth zero gradient interior of the colored region. We define the gradient force as the force at an arbitrary face point due to the surface color gradient. FIGS. 14A and 14B illustrate the gradient force computation for irregular polygonal surfaces for a vertex $P_0$ with color magnitude $S_0$. As shown in FIG. 14A, the color magnitudes $S_1$ through $S_5$ represent the color magnitudes at the five vertices adjacent to $P_0$. As shown in FIG. 14B, the color gradient is computed as a weighted combination of vectors corresponding to outward pointing edges from the vertex to all its neighbors. Weights are assigned based on the differences in the magnitudes of scalar values at the vertices.

More generally, let the M vertices connected to $P_0$ be labeled as $P_1$ through $P_M$ with color magnitudes $S_1$ through $S_M$ respectively. We compute the color gradient at $P_0$ as:

$$t_0 = \sum_{i=1}^{M} (S_i - S_0)(P_i - P_0) \tag{17}$$

We compute and store this gradient at each of the mesh vertices. At an arbitrary face point the gradient force is given by an interpolation of the gradients at the vertices of that face, based on the barycentric coordinates of the face point. This gradient force now becomes the color attraction force on that particular face point.

Figure 15A:
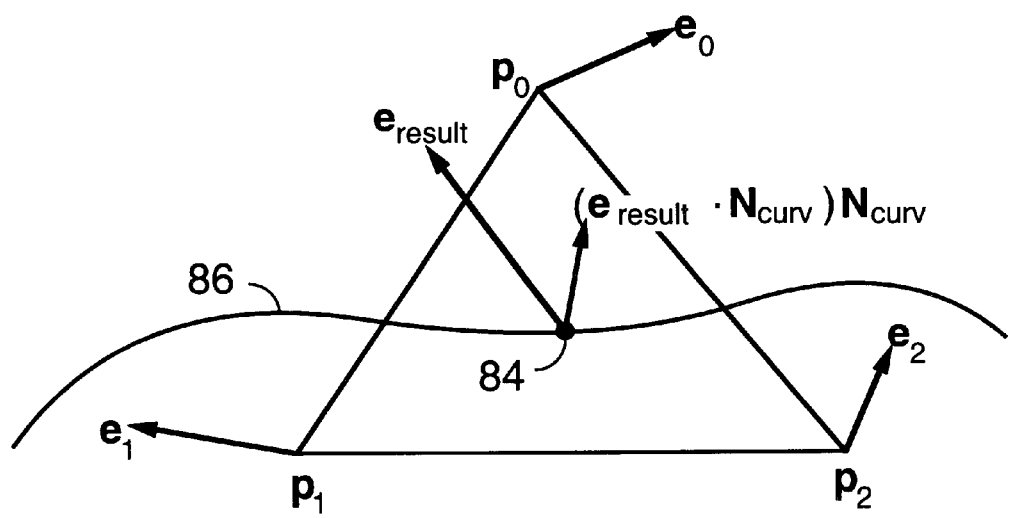

FIG. 15A shows how the computed color attraction forces are used in the surface snake relaxation strategy. To compute the color attraction force at an arbitrary face point 84 of a surface curve 86, first the gradient force $e_{result}$ at the face point is computed. Next, the component of this gradient force that is normal to the surface curve (and tangential to the surface itself) at the face point is extracted. Therefore, if the normal (on the surface) to the curve is given by $N_{curv}$, the color attraction force is given by $(e_{result} \cdot N_{curv}) N_{curv}$. This force is now used in conjunction with the variational Euler forces to move the surface curve to its minimum energy location. Thus, at each face point of the surface curve, an additional force due to color attraction is added to the variational Eulerian forces. This force is the component of the gradient force at that face point that is in the direction of the normal (on the surface) to the curve. The component of the gradient force that is tangential to the curve at that face point is not used because the tangential component of the gradient force can only cause a redistribution of face points along the length of the curve. Recall that the distribution of our face points along the surface curve is already addressed by the arc length criterion. Therefore, including an additional tangential force at each face point of the surface curve will interfere with the arc length criterion. This is undesirable since it can cause a bunching up of face points along sections of the surface snake. For this reason the method excludes the tangential component to the curve (on the surface) of the gradient force from our color attraction force computation.

The resultant force on a particular face point $v_i$ of the surface snake is given by a weighted combination of the color attraction force and the variational Euler forces.

$$F_{result}(i) = K_{internal} F_{internal}(i) + K_{color} F_{color}(i) \tag{18}$$

By varying the relative weights of these terms a user can determine how closely the surface snake follows surface color information. A higher relative value of $K_{color}$ makes the surface snake conform more closely to surface color (at the expense of internal energy). This setting is appropriate for cases where the supplied color information is precise and well defined. On the other hand if the supplied color information is noisy or irregular, a lower $K_{color}$ value is preferable. This weighting ensures that the snake is only roughly guided by the noisy surface color information.

Figure 15B:
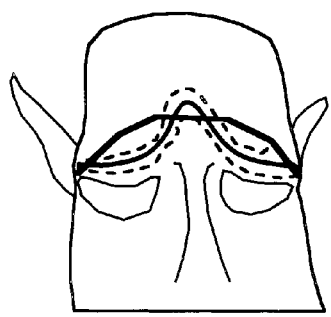
Figure 15C:
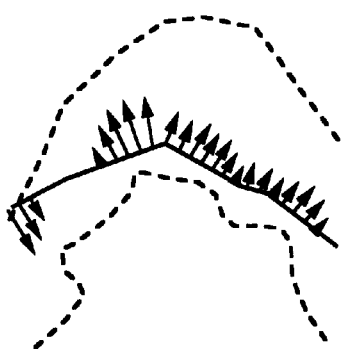
Figure 15D:
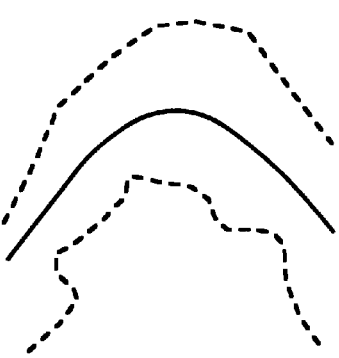

FIGS. 15B–15D illustrate how color attraction is used to assist the fast and accurate placement of feature curves on a polygon mesh. FIG. 15B shows the top portion of a wolf head. The physical model was colored along the brows prior to scanning. As a result, the polygon mesh representation of the model contains a colored region, indicated in the figure by dashed lines along its boundary. A rough or approximate feature curve may be quickly drawn by the user across the brow, and color attraction may then be used to automatically attract the approximate curve to the appropriate position along the brow, as shown in FIGS. 15C and 15D which are enlarged views of the center of the brow of FIG. 15B. The approximate curve drawn by the user is shown in FIG. 15C along with arrows indicating color attraction forces on the curve. The position of the curve after color attraction and curve relaxation is shown in FIG. 15D.

CONCLUSION

Curve editing operations such as the ones explained in the last section demonstrate the flexibility of the surface snake techniques provided by the present invention. First, since tools based on surface snakes operate directly on the surface curve (rather than indirectly through a space curve) they are more intuitive to use than tools based on space curves. For example, compare the space curve 88 of FIG. 16A with the surface curve 90 of FIG. 16B. Second, they are more robust to abrupt changes in surface curvature. Finally, the surface snake formulation allows the effective use of surface properties such as vertex color to assist in the curve painting and editing process. Such operations would not have been possible to duplicate using editing techniques based on space curves. The curve painting and editing tools (i.e., both space curve and surface snake based tools) provided by the present invention allow a user to efficiently specify complex curves on dense polygonal meshes, a task not possible using prior techniques.

What is claimed is:

1. In a 3-D computer graphics system, a computer-implemented method comprising:

storing in a memory an unparameterized non-planar surface, wherein the unparameterized non-planar surface is a two-dimensional manifold lacking a smooth parameterization;

storing in the memory a surface curve v comprising a set of surface points lying on the surface and a first-order curve weighting function α that represents first-order properties of the surface curve v;

computing a displaced surface curve v'=v+dv comprising a set of displaced surface points lying on the surface and the first-order curve weighting function α, wherein computing the displaced surface curve v' comprises constraining the displaced surface points of v' to the surface and imposing on the displaced surface points of v' the first-order curve weighting function α;

storing in the memory the displaced surface curve v'; and displaying a rendered representation of the displaced surface curve v'.

2. The method of claim 1 wherein:

the unparameterized surface is a polygon mesh representation of a 2-dimensional manifold embedded in a 3-dimensional ambient space.

3. The method of claim 1 wherein:

the surface curve v is a face-point curve representation of a 1-dimensional manifold; and the displaced surface curve v' is a face-point curve representation of a displaced 1-dimensional manifold.

4. The method of claim 1 wherein:

the surface curve v further comprises a second-order curve weighting function β that represents second-order properties of the surface curve v;

the displaced surface curve v' further comprises the second-order curve weighting function β; and computing the displaced surface curve v' further comprises imposing on the displaced surface points of v' the second-order curve weighting function β.

5. The method of claim 4 where in α and β are constant along the curve.

6. The method of claim 4 wherein at least one of α and β varies along the curve.

7. The method of claim 4 further comprising the step of determining at least one of α and β from user input.

8. The method of claim 1 wherein computing the displaced surface curve v' comprises:

calculating a curve displacement dv comprising a set of curve displacement vectors, wherein each curve displacement vector in dv corresponds to a surface point of the surface curve v, and is tangent to the surface at the surface point.

9. The method of claim 8 wherein calculating the curve displacement dv comprises assigning a predetermined value to a curve displacement vector.

10. The method of claim 9 wherein the predetermined value is zero.

11. The method of claim 9 wherein the predetermined value is determined from user input.

12. The method of claim 1 wherein computing the displaced surface curve v' further comprises calculating the displaced surface curve in part from a function S defined on the surface.

13. The method of claim 12 wherein the function S is determined in part from user input.

14. The method of claim 12 wherein the function S is determined from a coloring of the surface.

15. The method of claim 12 wherein the function S is determined from a curvature of the surface.

16. The method of claim 1 wherein the steps of computing and storing are repeated to produce a relaxation of the curve.

17. The method of claim 1 wherein computing the displaced surface curve further comprises imposing on the displaced surface points of v' an arc length force term.

18. In a 3-D computer graphics system, a computer-implemented method comprising:

storing in a memory an unparameterized representation of a non-planar surface, wherein the unparameterized representation is a two-dimensional representation of a manifold and lacks a smooth parameterization, surface color data for the surface, and a surface curve v comprising a set of surface points lying on the surface;

computing a displaced surface curve v'=v+dv comprising a set of displaced surface points lying on the surface, wherein computing the displaced surface curve v' comprises calculating the displaced surface curve in part from the surface color data for the surface, and constraining the displaced surface points of v' to the surface;

storing in the memory the displaced surface curve v'; and displaying a rendered representation of the displaced surface curve v'.

19. The method of claim 18 wherein:

the unparameterized representation is a polygon mesh representation;

the surface curve v is a face-point curve representation; and the displaced surface curve v' is a face-point curve representation.

20. The method of claim 18 wherein:

the surface curve v further comprises a first-order curve weighting function $\alpha$ and a second-order curve weighting function $\beta$, wherein $\alpha$ represents first-order properties of the surface curve v and $\beta$ represents second-order properties of the surface curve v; and computing the displaced surface curve v' further comprises imposing on the displaced surface points of v' the first-order curve weighting function $\alpha$ and the second-order curve weighting function $\beta$.

* * * * *